United States Patent
Fujita et al.

(10) Patent No.: US 9,807,780 B2
(45) Date of Patent: Oct. 31, 2017

(54) DATA SHARING SYSTEM

(71) Applicant: NEC Corporation, Tokyo (JP)

(72) Inventors: Norihito Fujita, Tokyo (JP); Hirofumi Ueda, Tokyo (JP)

(73) Assignee: NEC Corporation, Tokyo (JP)

(*) Notice: Subject to any disclaimer, the term of this patent is extended or adjusted under 35 U.S.C. 154(b) by 177 days.

(21) Appl. No.: 14/437,346

(22) PCT Filed: Oct. 17, 2013

(86) PCT No.: PCT/JP2013/006157
§ 371 (c)(1),
(2) Date: Apr. 21, 2015

(87) PCT Pub. No.: WO2014/076878
PCT Pub. Date: May 22, 2014

(65) Prior Publication Data
US 2015/0296529 A1 Oct. 15, 2015

(30) Foreign Application Priority Data
Nov. 19, 2012 (JP) .................................. 2012-253105

(51) Int. Cl.
H04W 72/04 (2009.01)
H04W 72/12 (2009.01)
H04L 29/08 (2006.01)

(52) U.S. Cl.
CPC ......... *H04W 72/12* (2013.01); *H04L 67/1097* (2013.01)

(58) Field of Classification Search
CPC ..... H04W 72/12; H04W 84/18; H04W 72/04; G06F 13/00; H04M 1/00
(Continued)

(56) References Cited

U.S. PATENT DOCUMENTS

2004/0072573 A1* 4/2004 Shvodian .......... H04L 29/12009
455/450
2006/0041943 A1* 2/2006 Singer ................ H04L 63/0823
726/27
(Continued)

FOREIGN PATENT DOCUMENTS

EP 1450273 A1 8/2004
JP 2004-248084 A 9/2004
(Continued)

OTHER PUBLICATIONS

International Search Report, Corresponding to PCT/JP2013/006157, dated Jan. 14, 2014, 1 page.
(Continued)

*Primary Examiner* — Kamran Afshar
*Assistant Examiner* — Farid Seyedvosoghi
(74) *Attorney, Agent, or Firm* — Wilmer Cutler Pickering Hale and Dorr LLP

(57) ABSTRACT

A request possibility determination unit 13 for a communications terminal 1-1 determines whether or not communications time required for obtaining data from a communications terminal 1-2 can be secured, between the communications terminal 1-2 and the communications terminal 1-1. A data acquisition unit 12: determines data that has not been stored in a data storage unit 14, among data on a list received as a result of a communications message from another communications terminal 1-2; and requests the determined data from the communications terminal 1-2, by using a communications message on the condition that the request possibility determination unit 13 has determined that communications time can be secured.

13 Claims, 17 Drawing Sheets

(58) Field of Classification Search
USPC .......... 455/410, 411, 414.1, 420, 426.1, 450, 455/509
See application file for complete search history.

(56) References Cited

U.S. PATENT DOCUMENTS

2012/0038489 A1* 2/2012 Goldshmidt ........... G08G 1/163
  340/903
2012/0246275 A1   9/2012 Ueda et al.

FOREIGN PATENT DOCUMENTS

| JP | 2005-267157 A | 9/2005 |
| JP | 2006-186599 A | 7/2006 |
| JP | 2007-158478 A | 6/2007 |
| WO | WO-2011/114584 A1 | 9/2011 |

OTHER PUBLICATIONS

Vandat. A., Becker D., "Epidemic Routing for Partially-Connected Ad Hoc Networks," Tech. Report CS-200006, Duke University, Department of Computer Science, Jul. 2000, 15 pages.
Arezu Moghadam et al. "7DS—A Modular Platform to Develop Mobile Disruption-Tolerant Applications", Next Generation Mobile Applications, Services and Technologies, 2008. NGMAST '08. The Second International Conference Next Generation Mobile Applications, Services, and Technologies, IEEE, Piscataway, NJ, USA Sep. 16, 2008, XP032431367, pp. 177-183 (7 pages).
Extended European Search Report issued in corresponding European Patent Application No. 13854482.0, dated Oct. 24, 2016, 7 pages.

* cited by examiner

Fig.7

LIST NOTIFICATION MESSAGE

| TRANSMISSION SOURCE INFORMATION | NODE ID |  |
|---|---|---|
| | IP ADDRESS | |
| | NODE VECTOR (POSITION, SPEED, DIRECTION) | |
| LIST | CONTENTS ID | SIZE |
| | CONTENTS A | ZA |
| | CONTENTS B | ZB |
| | ⋮ | ⋮ |

Fig.14

DIFFERENTIAL CONTENTS

| CONTENTS ID | SIZE |
|---|---|
| CONTENTS A | ZA |
| CONTENTS B | ZB |
| CONTENTS C | ZC |

Fig.15

LIST NOTIFICATION MESSAGE

| TRANSMISSION SOURCE INFORMATION | NODE ID | | |
|---|---|---|---|
| | IP ADDRESS | | |
| | NODE VECTOR (POSITION, SPEED, DIRECTION) | | |
| LIST | CONTENTS ID | SIZE | FLAG |
| | CONTENTS A | ZA | "1" |
| | CONTENTS B | ZB | "0" |
| | ⋮ | ⋮ | ⋮ |

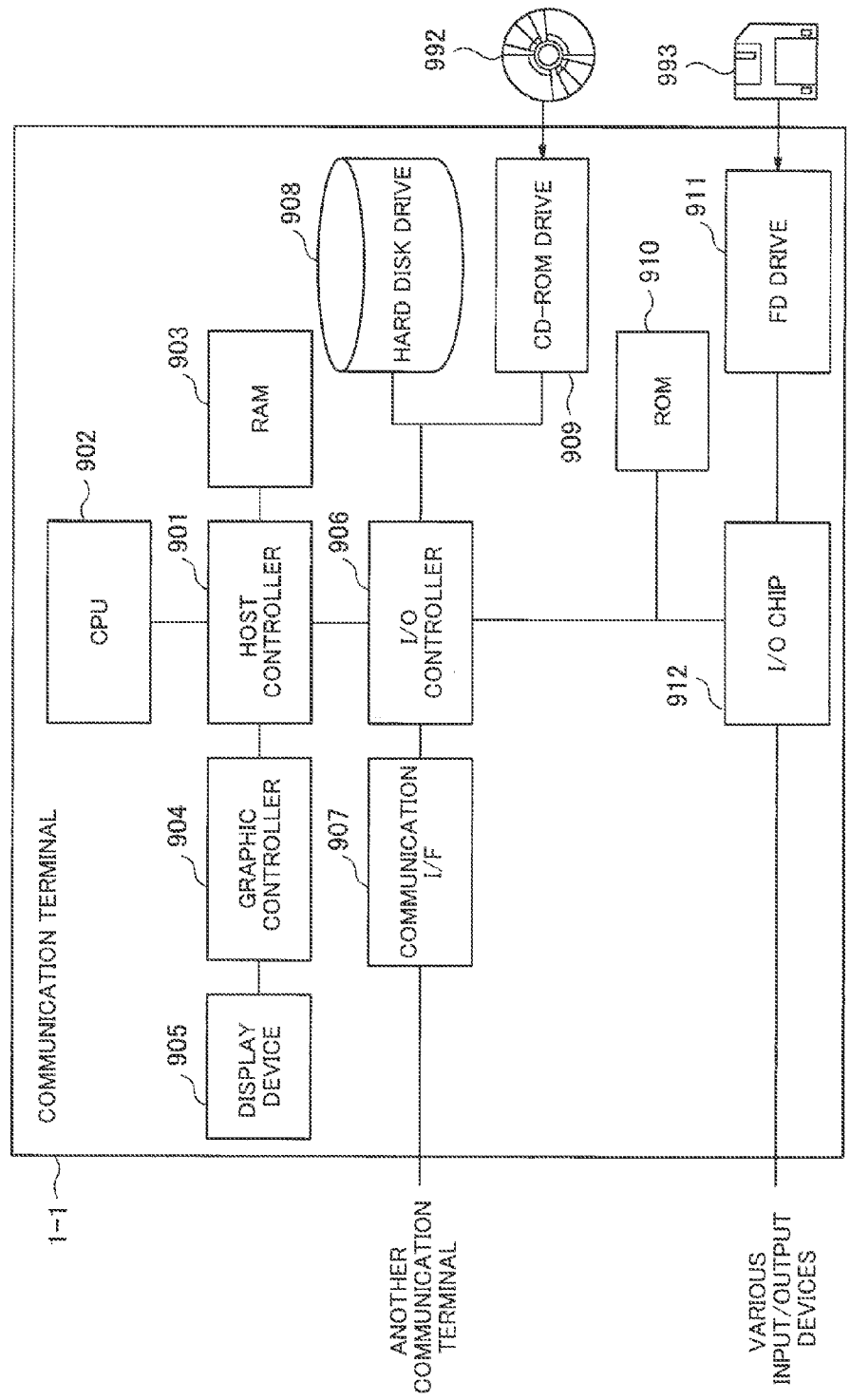

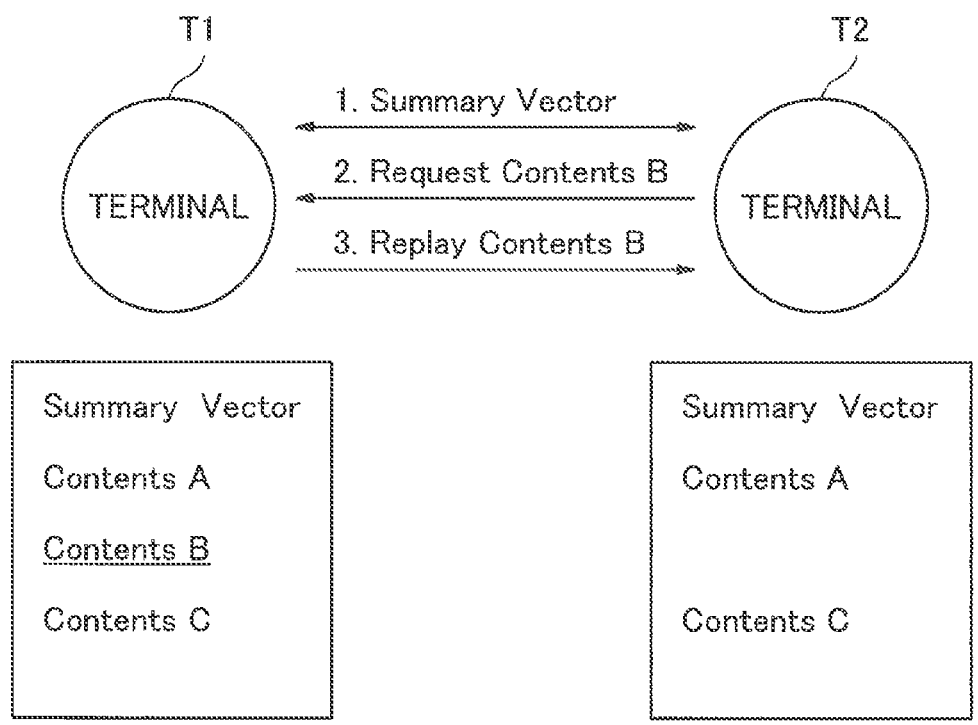

DATA SHARING SYSTEM

CROSS-REFERENCE TO RELATED APPLICATIONS

The present application is a national stage application of International Application No. PCT/JP2013/006157 entitled "Data sharing system," filed on Oct. 17, 2013, which claims the benefit of priority from Japanese Patent Application No. JP2012-253105, filed on Nov. 19, 2012, the disclosures of which are incorporated herein in their entirety by reference thereto.

TECHNICAL FIELD

The present invention relates to a data sharing system that shares data among a plurality of communication terminals which can communicate with one another in a wireless manner, a communication terminal, a data sharing method, and a program.

BACKGROUND ART

As one kind of a scheme of sharing data among a plurality of communication terminals, there is a scheme in which individual communication terminals share data in a distributed manner without using a central management apparatus such as a server.

For example, a technology, in which when communication terminals have approached to one another by movement and the like, they exchange their own information and perform synchronization of possession information by using an Epidemic scheme, has been proposed as a first associated technology associated with the present invention (for example, see Non-Patent Literature 1). In the Epidemic scheme, when a communication terminal in a network detects another communication terminal, the communication terminal exchanges its own summary vector (hereinafter, written as SV) and recognizes the contents of SV of the other communication terminal. The SV is a message which has summarized possession information of a terminal and is notified to another communication terminal. Based on the received SV, the communication terminal investigates data not possessed therein and attempts to acquire the data. For example, as illustrated in FIG. 17, a terminal T1 and a terminal T2 having approached to each other by movement mutually exchange SV. Next, the terminal T2 confirms whether there is data not possessed therein by comparing the SV of the terminal T1 with its own SV. In the example of FIG. 17, since the terminal T2 does not possess data B, the terminal T2 transmits an acquisition request of the data B to the terminal T1 and acquires the data B from the terminal T1. The aforementioned operation is repeated by all terminals in a network, so that these terminals allow possession information among them to coincide with one another.

Furthermore, as a second associated technology associated with the present invention, the following technology has been proposed (for example, see Patent Literature 1). First, a communication terminal mounted to a vehicle detects the position, relative speed and the like of a communication terminal (a counterpart terminal) mounted to another vehicle and estimates a communicable time before stating communication with the counterpart terminal by short range wireless communication. Secondly, as the communicable time is further short according to the estimation results, a further light communication protocol is selected. In detail, in the second associated technology associated with the present invention, when the communicable time is short, a communication protocol (for example, ALOHA), in which a time required for the transmission/reception of parts (an access control packet, a header part and the like) other than information (a payload) of data itself is short, is selected as the aforementioned light communication protocol. Furthermore, when the communicable time is long, a communication protocol such as CSMA/CA (Carrier Sense Multiple Access with Collision) is selected.

CITATION LIST

Patent Literature

PTL 1: Japanese Laid-open Patent Publication No. 2006-186599

Non Patent Literature

NPL 1: A. Vandat, D. Becker, "Epidemic Routing for Partially-Connected Ad Hoc Networks", Tech. Report CS-200006, Duke University, April 2000

SUMMARY OF INVENTION

Technical Problem

In the aforementioned first associated technology of exchanging mutual information and performing synchronization of possession information, when data not possessed in the communication terminal exists in data possessed in the other communication terminal, the data acquisition request is transmitted to the other communication terminal. However, in the case in which the communication terminal approaches the other communication terminal, even though the data acquisition request is transmitted from the communication terminal to the other communication terminal, when a communicable time, which can be secured between the communication terminal and the other communication terminal, is short, communication may be interrupted during the reception of data. Therefore, the communication terminal does not acquire data. In the aforementioned second associated technology, as the communicable time is further short, a further light communication protocol is selected, resulting in an increase in data acquisition probability. However, in the aforementioned second associated technology, since any communication protocol is selected even though the communication time, which can be secured between the communication terminals, is short and data acquisition is attempted, a communication band is wastefully consumed.

OBJECT OF THE INVENTION

Therefore, an object of the present invention is to provide a data sharing system having solved a problem that a communication band is wastefully consumed.

Solution to Problem

A data sharing system according to a first aspect of the present invention is a data sharing system that shares data between a plurality of communication terminals capable of exchanging a communication message in a wireless manner, wherein each communication terminal includes: a data storage unit that stores one or more pieces of data; a data provision unit that transmits a list, in which information of data stored in the data storage unit has been written, to the another communication terminal by the communication message, reads data, which has been requested by the communication message from the other communication terminal, from the data storage unit, and transmits the data to the other communication terminal by the communication message; a request possibility determination unit that determines whether it is possible to secure a communication time required for acquiring the data from the other communication terminal, between the other communication terminal having transmitted the list to a self-communication terminal by the communication message and a self-communication terminal; and a data acquisition unit that decides data not stored in the data storage unit among data on the list received by the communication message from the other communication terminal, and requests the decided data from the other communication terminal by the communication message on a condition that the request possibility determination unit determines that it is possible to secure the communication time.

A communication terminal according to a second aspect of the present invention includes: a data storage unit that stores one or more pieces of data; a data provision unit that transmits a list, in which information of data stored in the data storage unit has been written, to another communication terminal by a communication message, reads data, which has been requested by the communication message from the other communication terminal, from the data storage unit, and transmits the data to the other communication terminal by the communication message; a request possibility determination unit that determines whether it is possible to secure a communication time required for acquiring the data from the other communication terminal, between the other communication terminal having transmitted the list to a self-communication terminal by the communication message and a self-communication terminal; and a data acquisition unit that decides data not stored in the data storage unit among data on the list received by the communication message from the other communication terminal, and requests the decided data from the other communication terminal by the communication message on a condition that the request possibility determination unit determines that it is possible to secure the communication time.

A data sharing method according to a third aspect of the present invention is a data sharing method that shares data between a first communication terminal and a second communication terminal capable of exchanging a communication message in a wireless manner, and includes: a first step in which the first communication terminal transmits a list, in which information of data possessed in a self-communication terminal has been written, to the second communication terminal by the communication message; a second step in which the second communication terminal decides data not possessed in a self-communication terminal among data on the list received by the communication message from the first communication terminal; a third step in which the second communication terminal determines whether it is possible to secure a communication time required for acquiring the data from the first communication terminal, between a self-communication terminal and the first communication terminal, and requests the decided data from the first communication terminal by the communication message when it is possible to secure the communication time; and a fourth step in which the first communication terminal transmits data requested by the communication message from the second communication terminal to the second communication terminal by the communication message.

A data sharing method according to a fourth aspect of the present invention is a data sharing method that shares data between a first communication terminal and a plurality of other communication terminals capable of exchanging a communication message in a wireless manner, and includes: a first step in which a plurality of the other communication terminals transmits a list, in which information of data possessed in a self-communication terminal has been written, to the first communication terminal by the communication message; a second step in which the first communication terminal decides data not possessed in a self-communication terminal among data on the list received by the communication message from the plurality of other communication terminals; a third step in which when it is possible to acquire same data not possessed in a self-communication terminal from any one of the plurality of other communication terminals, the first communication terminal decides one communication terminal with a higher possibility of acquiring the data among the other communication terminals capable of securing a communication time required for acquiring the data between a self-communication terminal and the one communication terminal, and requests the decided data from the decided one communication terminal by the communication message; and a fourth step in which the one communication terminal transmits data requested by the communication message from the first communication terminal to the first communication terminal by the communication message.

A data sharing method according to a fifth aspect of the present invention is a data sharing method in which a communication terminal having a data storage unit for storing one or more pieces of data and capable of exchanging a communication message with another communication terminal in a wireless manner shares data with the other communication terminal, and includes: a first step of receiving a list, in which information of data possessed in the other communication terminal has been written, from the other communication terminal by the communication message; a second step of deciding data not possessed in the data storage unit among data on the list received from the other communication terminal; and a third step of determining whether it is possible to secure a communication time required for acquiring the data from the other communication terminal between a self-communication terminal and the other communication terminal, and requesting the decided data from the other communication terminal by the communication message when it is possible to secure the communication time.

A program according to a sixth aspect of the present invention causes a computer including a data storage unit for storing one or more pieces of data to serve as a data provision unit that transmits a list, in which information of data stored in the data storage unit has been written, to the another communication terminal by the communication message, reads data, which has been requested by the communication message from the other communication terminal, from the data storage unit, and transmits the data to the other communication terminal by the communication message; a request possibility determination unit that determines whether it is possible to secure a communication time required for acquiring the data from the other communication terminal, between the other communication terminal having transmitted the list to a self-communication terminal by the communication message and a self-communication terminal; and a data acquisition unit that decides data not stored in the data storage unit among data on the list received by the communication message from the other communication terminal, and requests the decided data from the other communication terminal by the communication message on a condition that the request possibility determination unit determines that it is possible to secure the communication time.

Advantageous Effects of Invention

According to the present invention, it is possible to prevent a communication band from being wastefully consumed.

BRIEF DESCRIPTION OF DRAWINGS

FIG. 7 is a diagram illustrating one example of a list notification message.

FIG. 14 is a diagram illustrating the size of differential contents.

FIG. 15 is a diagram illustrating another example of a list notification message.

FIG. 16 is a block diagram illustrating one example of a hardware configuration when a communication terminal according to an exemplary embodiment of the present invention has been configured by an electronic information processing apparatus such as a computer.

FIG. 17 is a diagram for explaining a technology disclosed in Non-Patent Literature 1.

DESCRIPTION OF EMBODIMENTS

Next, exemplary embodiments of the present invention will be described in detail with reference to the accompanying drawings.

[First Exemplary Embodiment]

Figure 1:
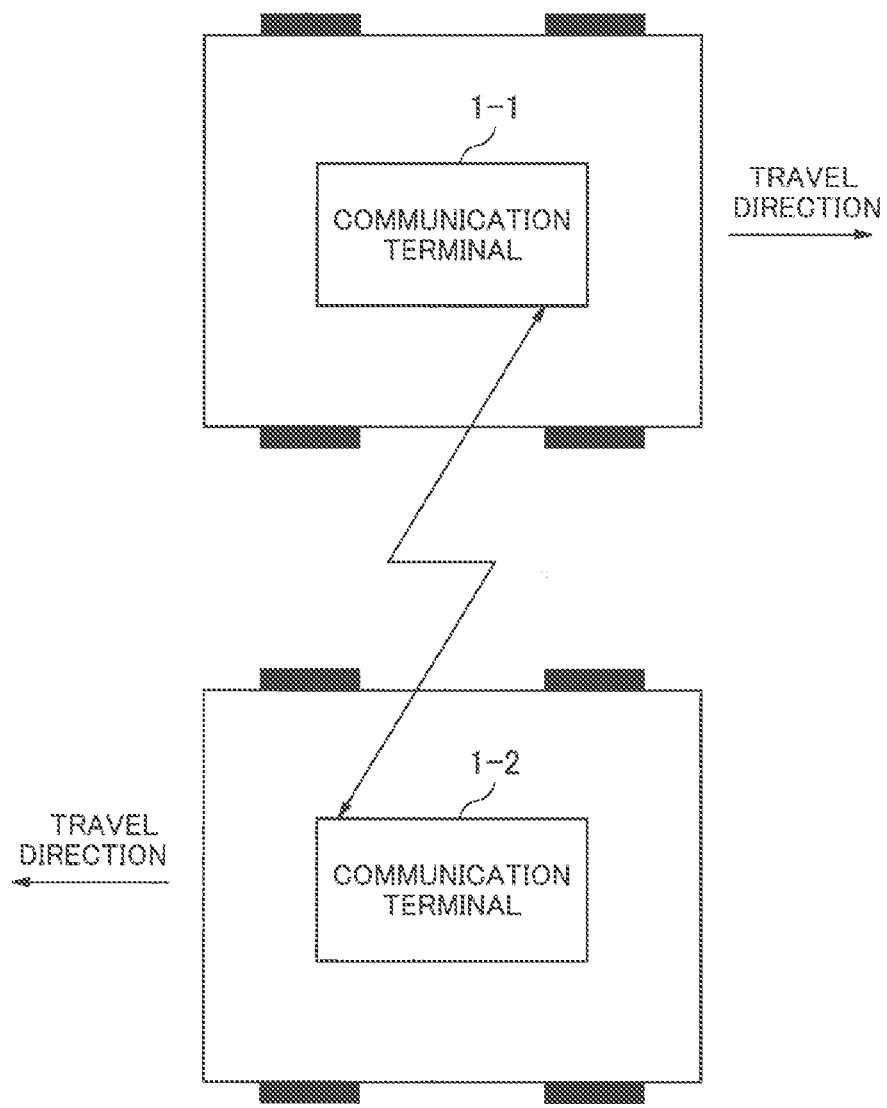
FIG. 1 is a block diagram of a data sharing system of a first exemplary embodiment according to the present invention.

Referring to FIG. 1, a first exemplary embodiment of a data sharing system according to the present invention includes communication terminals 1-1, 1-2 mounted in vehicles. The communication terminals 1-1, 1-2 are configured to be able to communicate with each other in a wireless manner. Then, when the communication terminals 1-1, 1-2 approach each other by movement, they exchange messages and share data. In addition, in the example of FIG. 1, the number of the communication terminals is 2; however, the present invention is not limited thereto if the number of the communication terminals is plural. Furthermore, in FIG. 1, both the communication terminals 1-1, 1-2 are mobile communication terminals; however, any one of them may be a stationary communication terminal. Furthermore, in the present exemplary embodiment, the communication terminals constituting the data sharing system are mounted in a vehicle. However, communication terminals of the present invention are not limited only to communication terminals mounted in a vehicle, and may be portable terminals including smart phones, cellular phones and the like.

Figure 2:
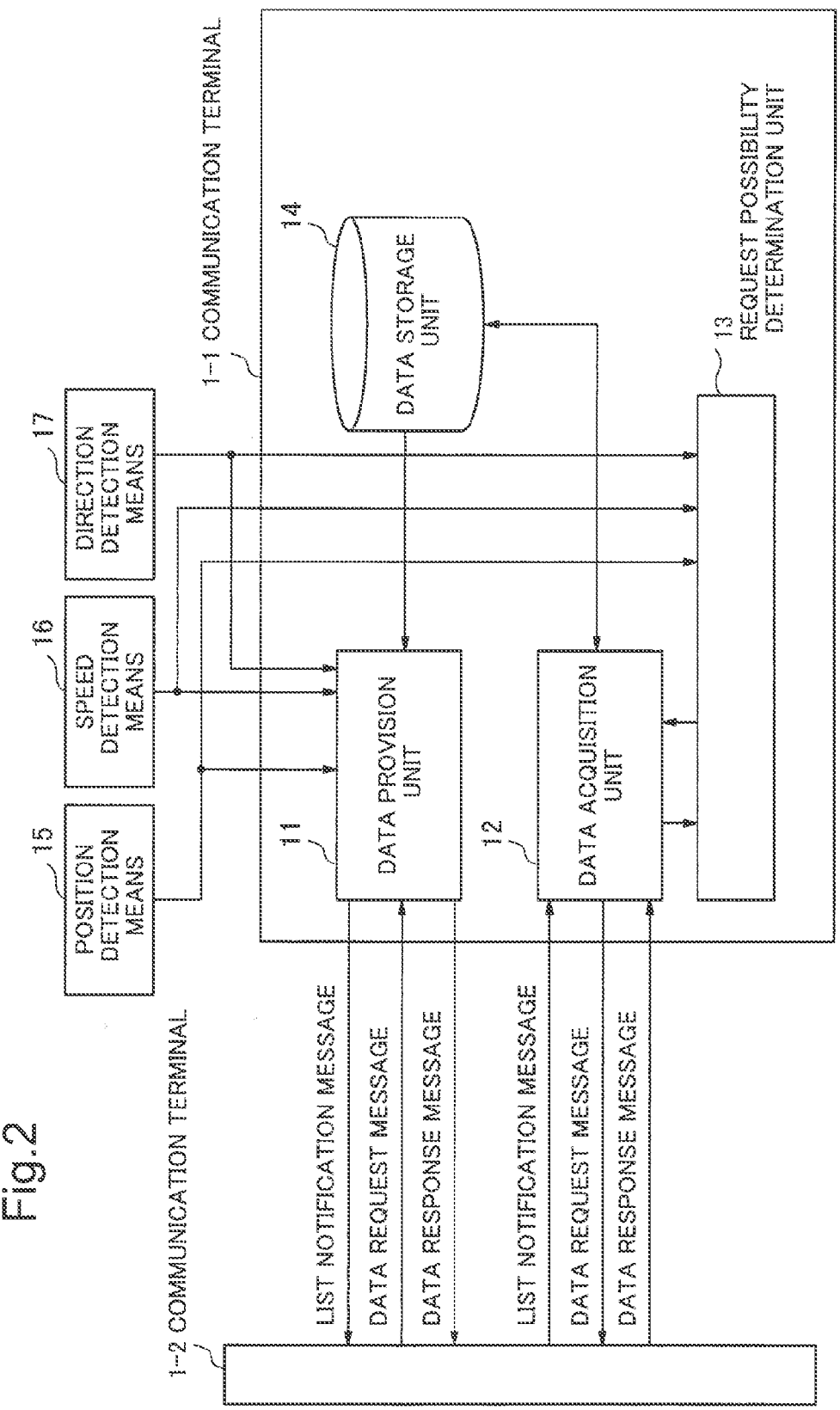
FIG. 2 is a block diagram of a configuration example of a communication terminal in a first exemplary embodiment.

Referring to FIG. 2, the communication terminal 1-1 includes a data provision unit 11, a data acquisition unit 12, a request possibility determination unit 13, and a data storage unit 14. Furthermore, a position detection means 15, a speed detection means 16, and a direction detection means 17 are connected to the communication terminal 1-1. In addition, the communication terminal 1-2 also has a similar configuration.

The data storage unit 14 stores one or more pieces of data. Individual data is arbitrary. For example, the data may be any one of text data, image data, and voice data, and may be a mixture thereof. Furthermore, the data may also be called contents.

The position detection means 15 includes a function of detecting a position (for example, latitude and longitude) of the communication terminal 1-1. The speed detection means 16 includes a function of detecting a speed of the communication terminal 1-1. The direction detection means 17 includes a function of detecting a movement direction (for example, an angle between a predetermined parallel and a movement direction or an angle between a predetermined longitude line and a movement direction) of the communication terminal 1-1.

The data provision unit 11 includes a function of transmitting a list notification message including a list, in which information of data stored in the data storage unit 14 has been written, to the communication terminal 1-2 existing in the vicinity of the communication terminal 1-1. Furthermore, the data provision unit 11 includes a function of reading data, which has been requested by a data request message received from the communication terminal 1-2, from the data storage unit 14 and transmitting the read data to the communication terminal 1-2 by a data response message.

The data acquisition unit 12 includes a function of determining whether there is differential data when a list notification message has been received from the other communication terminal 1-2. The list notification message includes a list in which information of data possessed in the terminal 1-2 has been written. The differential data is data not possessed in the communication terminal 1-1 and possessed in the other communication terminal 1-2. Furthermore, the data acquisition unit 12 includes a function of outputting a decision request to the request possibility determination unit 13 when there is the differential data. Herein, the decision request means a request for deciding whether to transmit a data request message to the other communication terminal 1-2. Moreover, the data acquisition unit 12 includes a function of transmitting a data request message for requesting the acquisition of the differential data to the communication terminal 1-2 when the decision content of the request possibility determination unit 13 for the decision request indicates transmission of the data request message. When the decision content of the request possibility determination unit 13 for the decision request indicates non-transmission of the data request message, the data acquisition unit 12 does not transmit the data request message to the communication terminal 1-2.

The request possibility determination unit 13 includes the following functions. If the decision request is received from the data acquisition unit 12, when the differential data has been requested for the other communication terminal 1-2, the request possibility determination unit 13 determines whether there is a possibility of acquiring the differential data. Next, on the basis of the determination result, the request possibility determination unit 13 decides whether to transmit the data request message for requesting the acquisition of the differential data. In detail, the request possibility determination unit 13 determines whether it is possible to secure a communication time required for acquiring data from the communication terminal 1-2 between the communication terminal 1-1 and the communication terminal 1-2. Then, when it is possible to secure the aforementioned communication time, the request possibility determination unit 13 informs the data acquisition unit 12 of the transmission of the data request message as a reply, and when it is not possible to secure the aforementioned communication time, the request possibility determination unit 13 informs the data acquisition unit 12 of the non-transmission of the data request message as a reply.

Figure 3:
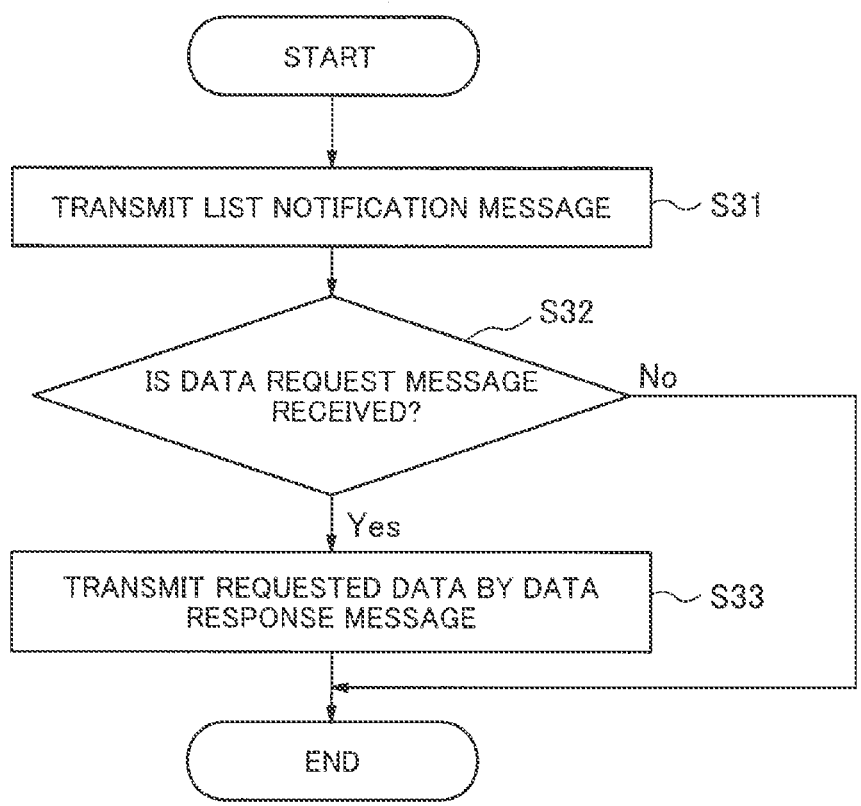
FIG. 3 is a flowchart illustrating a processing example of a data provision unit in a first exemplary embodiment.
Figure 4:
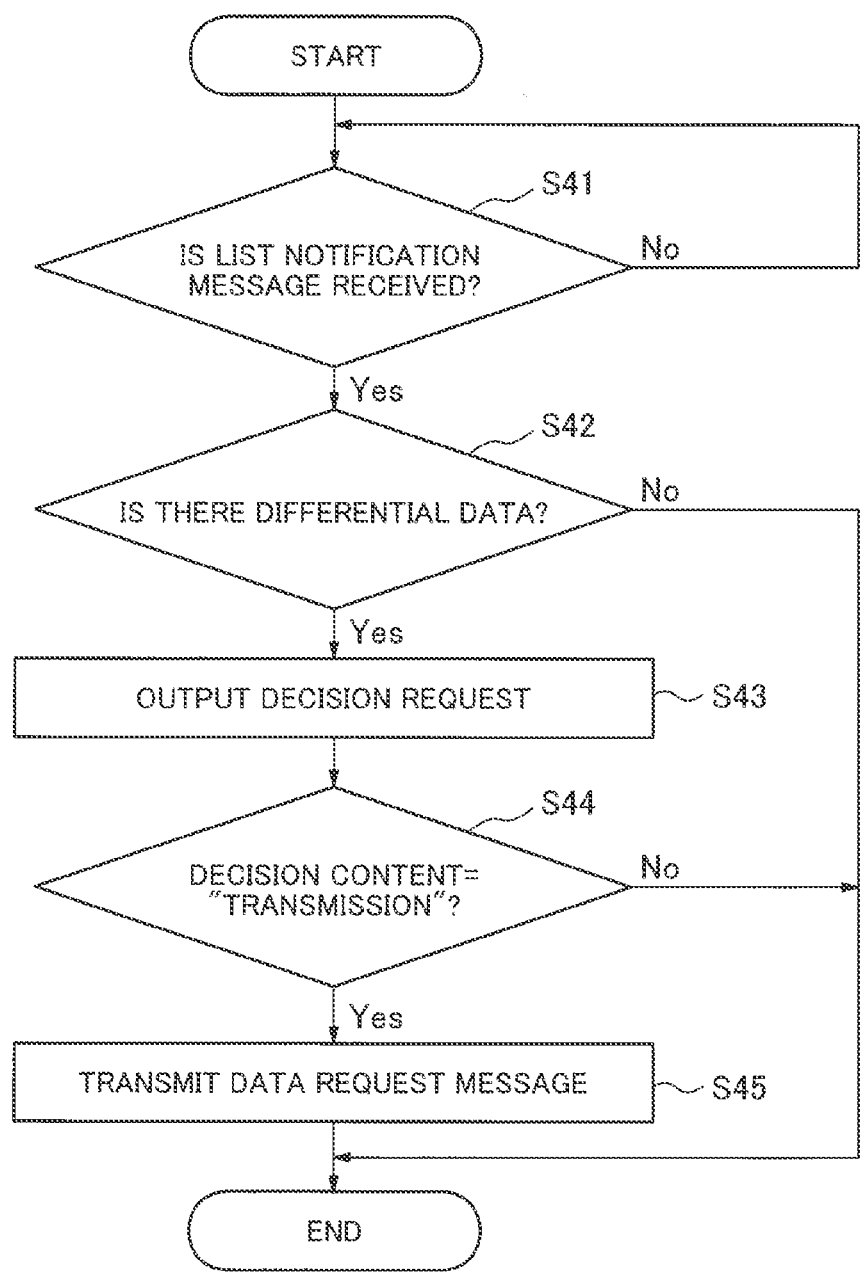
FIG. 4 is a flowchart illustrating a processing example of a data acquisition unit in a first exemplary embodiment.
Figure 5:
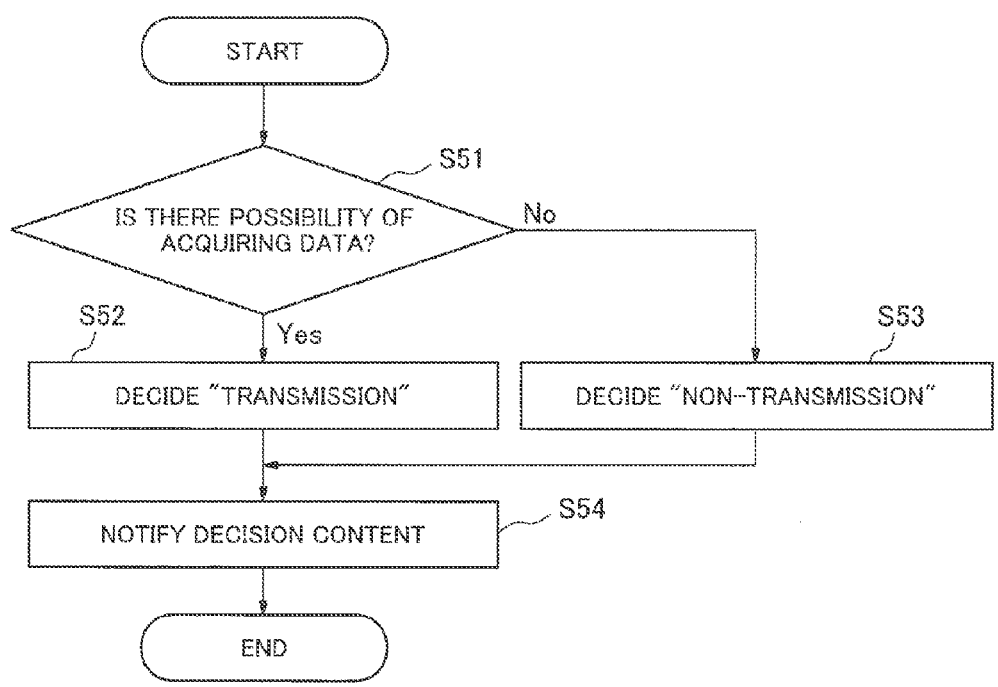
FIG. 5 is a flowchart illustrating a processing example of a request possibility determination unit in a first exemplary embodiment.

Next, with reference to FIG. 3 to FIG. 5, an operation of the present exemplary embodiment will be described in detail. FIG. 3 is a flowchart illustrating a processing example of the data provision unit 11, FIG. 4 is a flowchart illustrating a processing example of the data acquisition unit 12, FIG. 5 is a flowchart illustrating a processing example of the request possibility determination unit 13.

First, the operation of the data provision unit 11 will be described. The data provision unit 11, for example, performs processing illustrated in the flowchart of FIG. 3 regularly or at an arbitrary timing such as the time at which new data has been stored in the data storage unit 14. Referring to FIG. 3, first, the data provision unit 11 transmits a list notification message including a list, in which information of data stored in the data storage unit 14 has been written, and detection results to the communication terminal 1-2 (step S31). The detection results are detection results by the position detection means 15, the speed detection means 16, and the direction detection means 17.

When the list notification message is received from the communication terminal 1-1, a data acquisition unit and a request possibility determination unit (not illustrated) of the communication terminal 1-2 perform processes to be described later, which are similar to those of the data acquisition unit 12 and the request possibility determination unit 13. Then, when it is determined that there is differential data and there is a possibility of acquiring differential data from the communication terminal 1-1, the communication terminal 1-2 transmits a data request message for requesting the acquisition of the differential data to the communication terminal 1-1. The differential data is data not possessed in the communication terminal 1-2 but is possessed in the other communication terminal 1-1.

After the list notification message is transmitted, when a data request message has been received from the communication terminal 1-2 in a predetermined time (Yes in step S32), the data provision unit 11 of the communication terminal 1-1 performs step S33. The data provision unit 11 reads data requested by the aforementioned data request message from the data storage unit 14, and transmits the data to the communication terminal 1-2 by a data response message (step S33). On the other hand, when the data provision unit 11 has not received the data request message from the communication terminal 1-2 in the predetermined time (No in step S32), the data provision unit 11 ends the procedure.

Next, the operations of the data acquisition unit 12 and the request possibility determination unit 13 will be described.

When the list notification message is received from the communication terminal 1-2 (Yes in step S41 of FIG. 4), the data acquisition unit 12 compares the aforementioned list with a list of data stored in the data storage unit 14, thereby determining whether there is differential data (step S42). The list notification message includes a list in which information of data possessed in the communication terminal 1-2 has been written. The differential data is data not possessed in the communication terminal 1-1 but is possessed in the communication terminal 1-2.

When there is no differential data (No in step S42), the data acquisition unit 12 ends the procedure. On the other hand, when there is the differential data (Yes in step S42), the data acquisition unit 12 outputs a decision request to the request possibility determination unit 13 (step S43).

If the decision request is received from the data acquisition unit 12, when the aforementioned differential data has been requested for the communication terminal 1-2, the request possibility determination unit 13 determines whether there is a possibility of acquiring the aforementioned differential data (step S51) as illustrated in FIG. 5.

In step S51, for example, it is determined whether it is possible to acquire the differential data by any one of the following methods (1) to (3).

(1) Determination Method Based on Speeds of Communication Terminals

First, the request possibility determination unit 13 obtains a speed difference between the speed of the communication terminal 1-1 detected by the speed detection means 16 and the speed of the communication terminal 1-2 included in the list notification message received from the communication terminal 1-2. Thereafter, the request possibility determination unit 13 compares the obtained speed difference with a predetermined threshold value. When the speed difference is smaller than the threshold value, the request possibility determination unit 13 determines that there is a possibility of acquiring the differential data from the communication terminal 1-2. When the speed difference is equal to or more than the threshold value, the request possibility determination unit 13 determines that there is no possibility of acquiring the differential data. That is, when the speed difference is large, since a communicable time is short, the request possibility determination unit 13 determines that there is no possibility of acquiring the differential data. The communicable time is a time from when the communication terminal 1-1 receives the list notification message from the communication terminal 1-2 until the communication terminal 1-1 then goes out of a communicable range in which communication with the communication terminal 1-2 is possible. In other words, in this determination method, the magnitude of the communicable time between the communication terminals is determined on the basis of the movement speeds of the communication terminals 1-1, 1-2.

(2) Determination Method Based on Positions of Communication Terminals

First, the request possibility determination unit 13 obtains a distance between both communication terminals 1-1, 1-2 on the basis of the position of the communication terminal 1-1 detected by the position detection means 15 and the position of the communication terminal 1-2 included in the list notification message received from the communication terminal 1-2. Thereafter, the request possibility determination unit 13 compares the obtained distance with a predetermined threshold value. When the distance is smaller than the threshold value, the request possibility determination unit 13 determines that there is a possibility of acquiring the differential data, and when the distance is equal to or more than the threshold value, the request possibility determination unit 13 determines that there is no possibility of acquiring the differential data. That is, when an initial distance between the terminals is long, as compared with the case in which the initial distance between the terminals is short, since a communicable time is averagely short, the request possibility determination unit 13 determines that there is no possibility of acquiring the differential data. The communicable time is a time until the communication terminal 1-1 goes out of a communicable range in which communication with the communication terminal 1-2 is possible. In other words, in this determination method, the magnitude of the communicable time between the communication terminals is determined on the basis of the positions of the communication terminals 1-1, 1-2.

(3) Determination Method Based on Movement Directions of Communication Terminals First, on the basis of an angle, the request possibility determination unit 13 determines whether the movement directions of both communication terminals 1-1, 1-2 are a direction in which both communication terminals 1-1, 1-2 are moving away from each other or a direction in which both communication terminals 1-1, 1-2 approach to each other. The angle is an angle between the movement direction of the communication terminal 1-1 detected by the direction detection means 17 and the movement direction of the communication terminal 1-2 included in the list notification message received from the communication terminal 1-2. When the movement directions are the direction in which they approach to each other, the request possibility determination unit 13 determines that there is a possibility of acquiring the differential data. When movement directions are the direction in which they are moving away from each other, the request possibility determination unit 13 determines that there is no possibility of acquiring the differential data. That is, when movement directions are the direction in which they are moving away from each other, since a communicable time is averagely short as compared with the case in which the movement directions are the direction in which they approach to each other, the request possibility determination unit 13 determines that there is no possibility of acquiring the differential data. The communicable time is a time until the communication terminal 1-1 goes out of a communicable range in which communication with the communication terminal 1-2 is possible. In other words, in this determination method, the magnitude of the communicable time between the communication terminals is determined on the basis of the movement directions of the communication terminals 1-1, 1-2.

Furthermore, the request possibility determination unit 13 may perform the determination by a combination of the aforementioned methods (1), (2), a combination of the aforementioned methods (1), (3), a combination of the aforementioned methods (2), (3), or a combination of the aforementioned methods (1), (2), (3). Furthermore, when it has been determined that there is a possibility of acquiring the differential data in all the combined methods, the request possibility determination unit 13 may determine that there is a possibility of acquiring the differential data.

When there is a possibility of acquiring the data (Yes in step S51), the request possibility determination unit 13 decides to transmit a data request message for requesting the acquisition of the data and notifies the data acquisition unit 12 of the decision contents (step S52, S54). On the other hand, when there is no possibility of acquiring the data (No in step S51), the request possibility determination unit 13 decides not to transmit the data request message and notifies the data acquisition unit 12 of the decision contents (step S53, S54).

When the decision contents notified from the request possibility determination unit 13 indicate "transmission of the data request message" (Yes in step S44 of FIG. 4), the data acquisition unit 12 transmits the data request message for requesting the acquisition of the differential data to the communication terminal 1-2. On the other hand, when the decision contents indicate "non-transmission of the data request message" (No in step S44), the data acquisition unit 12 ends the procedure.

According to the present exemplary embodiment, it is possible to obtain an effect that it is possible to prevent a communication band from being wastefully consumed. The reason for this is because the following configuration is provided. First, the data acquisition unit 12 receives the list notification message from the other communication terminal 1-2. Secondly, the request possibility determination unit 13 determines whether it is possible to secure a communicable time required for acquiring the differential data from the communication terminal 1-2 between the communication terminal 1-1 and the communication terminal 1-2. Thirdly, the request possibility determination unit 13 decides whether to transmit the data request message on the basis of the determination result.

[Second Exemplary Embodiment]

Next, a second exemplary embodiment of the present invention will be described in detail.

Figure 6:
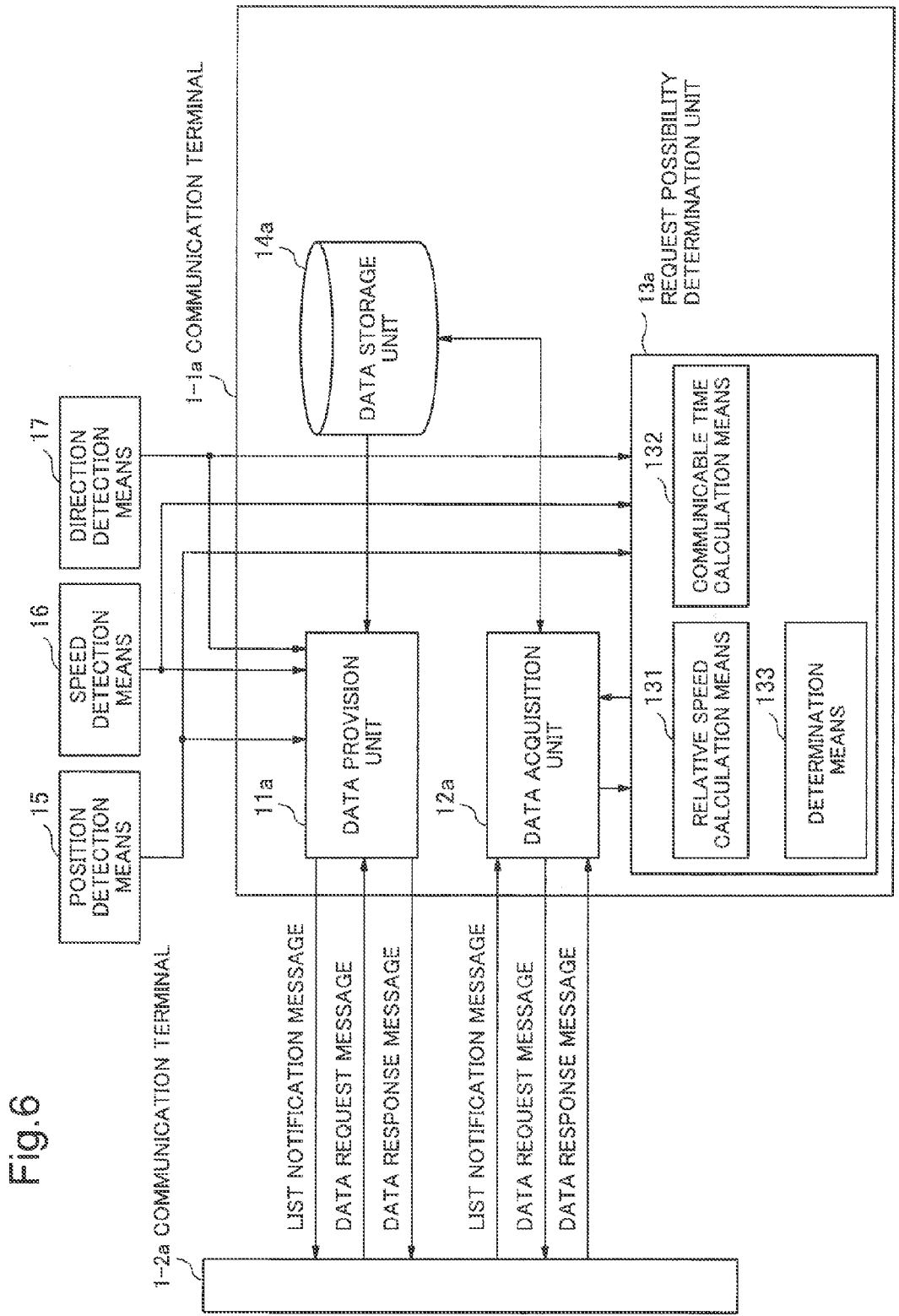
FIG. 6 is a block diagram of a communication terminal according to a second exemplary embodiment of the present invention.

Referring to FIG. 6, a data sharing system according to a second exemplary embodiment of the present invention includes communication terminals 1-1*a*, 1-2*a* configured to be able to communicate with each other in a wireless manner. The communication terminal 1-1*a* includes a data provision unit 11*a*, a data acquisition unit 12*a*, a request possibility determination unit 13*a*, and a data storage unit 14*a*. The data provision unit 11*a*, the data acquisition unit 12*a*, and the request possibility determination unit 13*a* can be realized by a CPU. Furthermore, a position detection means 15, a speed detection means 16, and a direction detection means 17 are connected to the communication terminal 1-1*a*. In addition, the communication terminal 1-2*a* also has a configuration similar to that of the communication terminal 1-1*a*. Furthermore, in the communication terminals 1-1*a*, 1-2*a*, both of them may be mobile communication terminals, or only one of them may be a mobile communication terminal.

The data storage unit 14*a* stores one or more contents.

The position detection means 15 includes a function of detecting a position (for example, latitude and longitude) of the communication terminal 1-1*a*. The speed detection means 16 includes a function of detecting a speed of the communication terminal 1-1a. The direction detection means 17 includes a function of detecting a movement direction (for example, an angle between a predetermined parallel and a movement direction or an angle between a predetermined longitude line and a movement direction) of the communication terminal 1-1a.

The data provision unit 11a includes a function of creating a list notification message and transmitting the list notification message to the communication terminal 1-2a existing in the vicinity of the communication terminal 1-1a. As illustrated in FIG. 7, the list notification message includes transmission source information and a list. The transmission source information includes a node ID (identification information), an IP address, and a node vector of the communication terminal 1-1a. The node vector includes the position of the communication terminal 1-1a detected by the position detection means 15, the speed of the communication terminal 1-1a detected by the speed detection means 16, and the movement direction of the communication terminal 1-1a detected by the direction detection means 17. The list includes a contents ID and a size of the contents stored in the data storage unit 14a. In this example, the list includes a contents ID and a size as information of data stored in the data storage unit 14a. However, information of data written in the list is not limited to the contents ID and the size. Data, for example, may be only a contents ID or other information such as a summary vector if it is information capable of specifying data.

Moreover, the data provision unit 11a includes a function of reading contents, which have been requested by a data request message received from the communication terminal 1-2a, from the data storage unit 14a. Furthermore, the data provision unit 11a has a function of transmitting the contents to the communication terminal 1-2a by a data response message.

The data acquisition unit 12a includes a function of outputting a decision request to the request possibility determination unit 13a when there are differential contents in the case in which a list notification message has been received. The list notification message includes a list in which information of contents possessed in the other communication terminal 1-2a has been written from the terminal 1-2a. The differential contents are contents not possessed in the communication terminal 1-1a, but are possessed in the other communication terminal 1-2a. Furthermore, the data acquisition unit 12a includes a function of transmitting a data request message for requesting the acquisition of the differential contents to the communication terminal 1-2a when decision contents of the request possibility determination unit 13a for the decision request indicate transmission of the data request message.

The request possibility determination unit 13a includes a relative speed calculation means 131, a communicable time calculation means 132, and a determination means 133.

The relative speed calculation means 131 includes a function of calculating a relative speed (a speed of the communication terminal 1-2a with respect to the communication terminal 1-1a) of the communication terminal 1-1a and the communication terminal 1-2a. For example, on the basis of the speed and the movement direction of the communication terminal 1-1a and the speed and the movement direction of the communication terminal 1-2a, the relative speed calculation means 131 calculates the relative speed of the communication terminal 1-1a and the communication terminal 1-2a. The speed and the movement direction of the communication terminal 1-1a are the speed and the movement direction respectively detected by the speed detection means 16 and the direction detection means 17. The speed and the movement direction of the communication terminal 1-2a are a speed and a movement direction included in a node vector of the list notification message received from the communication terminal 1-2a.

The communicable time calculation means 132 includes a function of calculating a communicable time T on the basis of the relative speed calculated by the relative speed calculation means 131, a position of the communication terminal 1-1a, a position of the communication terminal 1-2a, and information representing communicable ranges of the communication terminals 1-1a, 1-2a. The position of the communication terminal 1-1a is the position detected by the position detection means 15. The position of the communication terminal 1-2a is a position included in the list notification message received from the communication terminal 1-2a. The information representing the communicable ranges of the communication terminals 1-1a, 1-2a, for example, represents a maximum communicable distance. The communicable time T is a time from when the communication terminal 1-1a starts the reception of contents (a data response message) until the communication terminal 1-1a then goes out of a communicable range in which communication with the communication terminal 1-2a is possible. In the present exemplary embodiment, the communicable time T is an index value for determining whether it is possible to acquire contents from the communication terminal 1-2a. Herein, a start point of the communicable time is set as the time at which the communication terminal 1-1a starts the reception of contents. However, the start point of the communicable time may be the time at which the communication terminal 1-1a has received the list notification message from the communication terminal 1-2a. Alternatively, the start point may be an arbitrary point from the time of the reception of the aforementioned list notification message to the time at which the reception of contents is started. The arbitrary point, for example, may be the time point at which the communication terminal 1-1a has requested data with respect to the communication terminal 1-2a, or the time point at which the request possibility determination unit 13a has received the decision request from the data acquisition unit 12a. The reason for this is because a time from the time at which the aforementioned list notification message has been received to the time at which the reception of contents is started is very short.

The determination means 133 includes a function of comparing the communicable time T calculated by the communicable time calculation means 132 with a threshold value, thereby determining whether to transmit a data request message.

Figure 8:
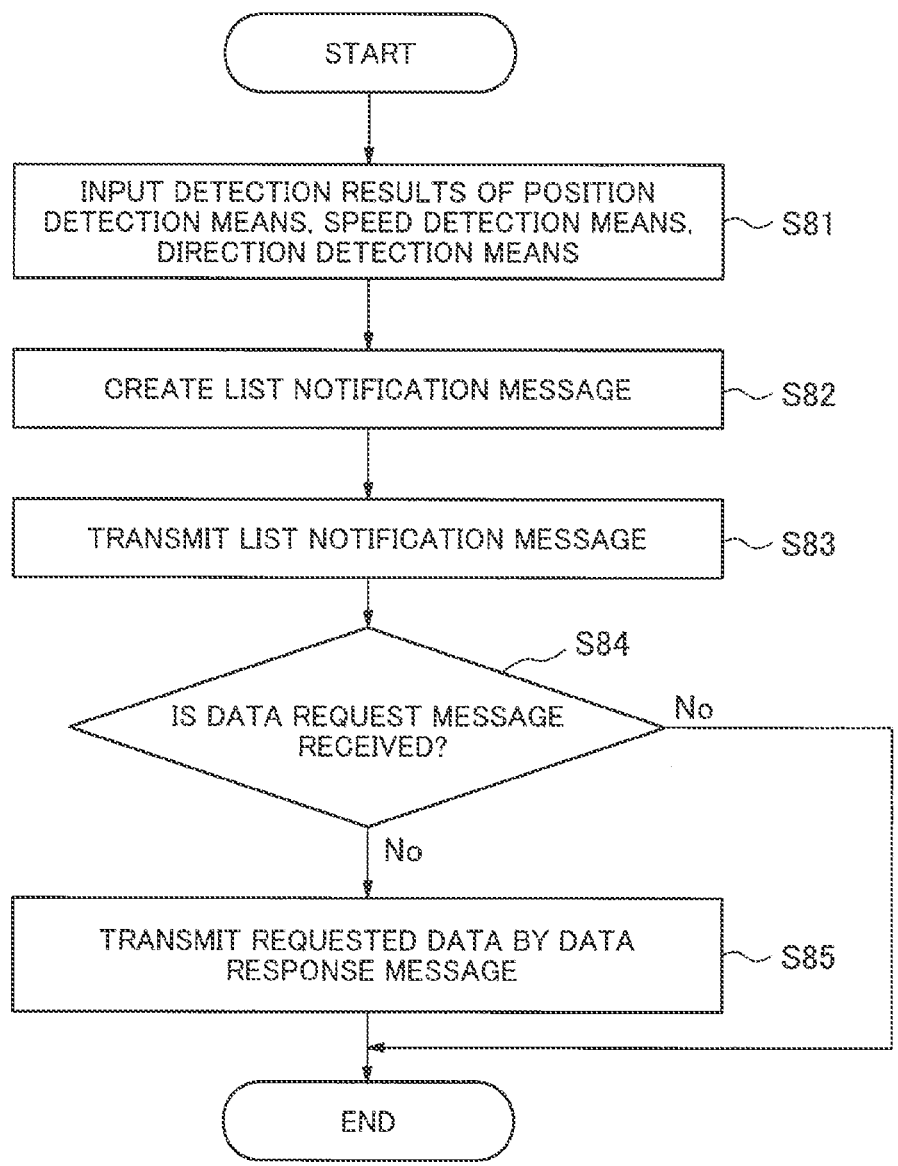
FIG. 8 is a flowchart illustrating a processing example of a data provision unit in a second exemplary embodiment.
Figure 9:
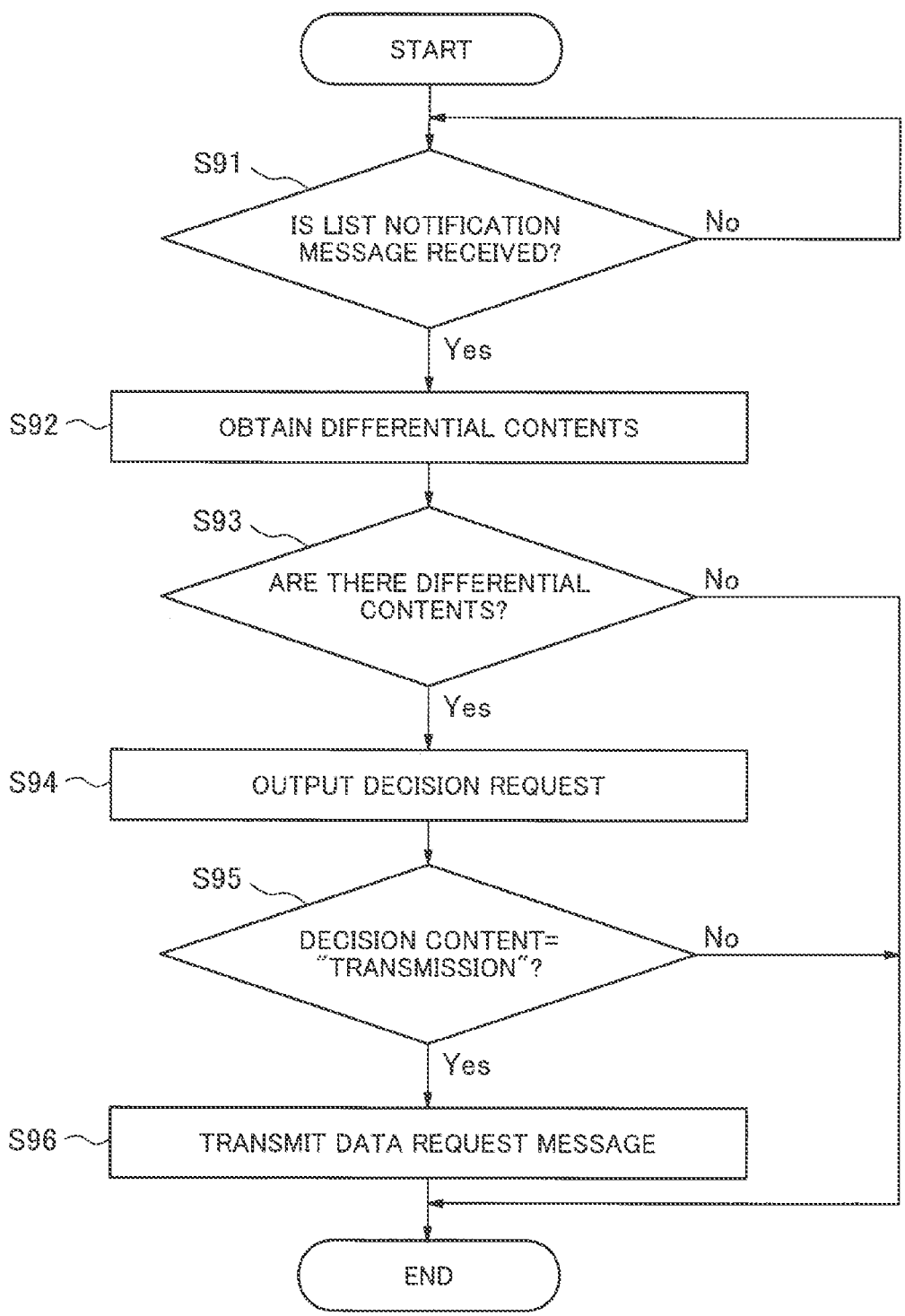
FIG. 9 is a flowchart illustrating a processing example of a data acquisition unit in a second exemplary embodiment.
Figure 10:
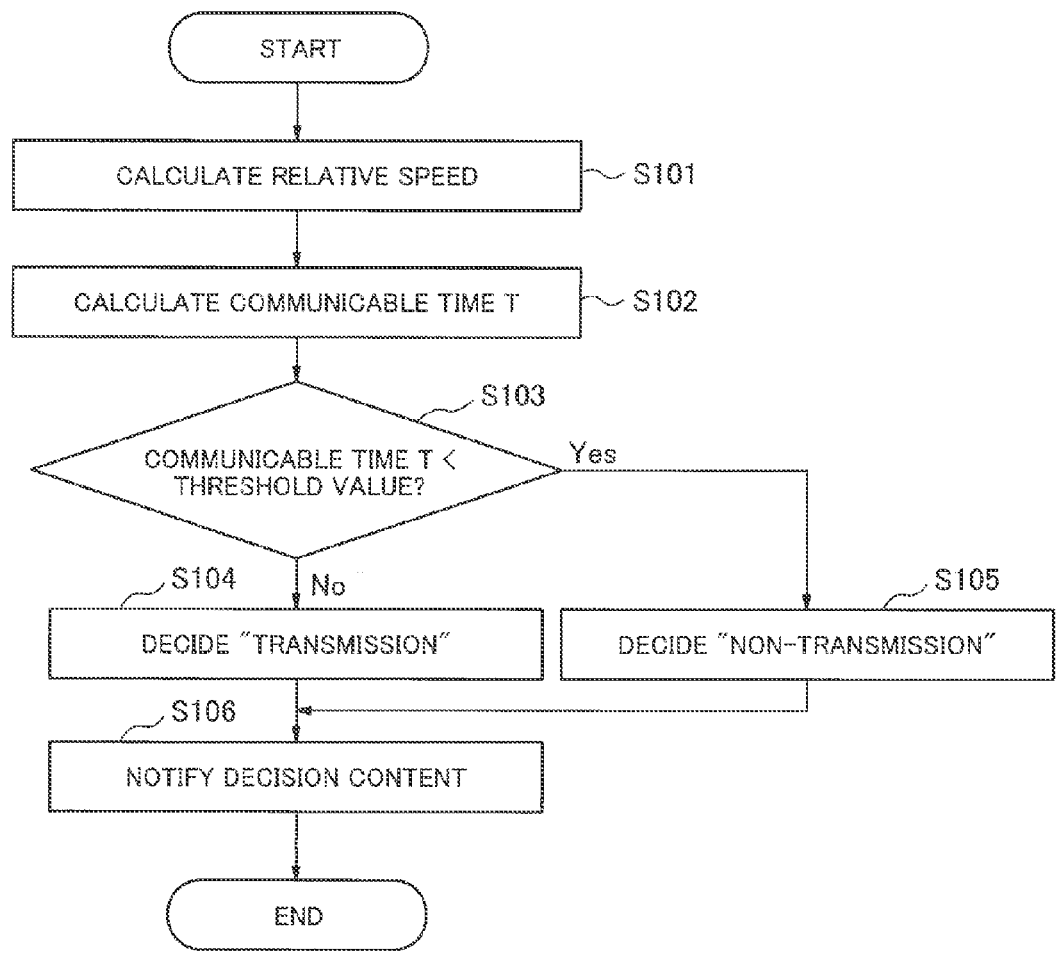
FIG. 10 is a flowchart illustrating a processing example of a request possibility determination unit in a second exemplary embodiment.

Next, with reference to FIG. 8 to FIG. 10, an operation of the present exemplary embodiment will be described in detail. In addition, FIG. 8 is a flowchart illustrating a processing example of the data provision unit 11a, FIG. 9 is a flowchart illustrating a processing example of the data acquisition unit 12a, FIG. 10 is a flowchart illustrating a processing example of the request possibility determination unit 13a.

First, the operation of the data provision unit 11a will be described. The data provision unit 11a, for example, performs processing illustrated in the flowchart of FIG. 8 regularly or at an arbitrary timing such as whenever new data is stored in the data storage unit 14a. Referring to FIG. 8, first, the data provision unit 11a inputs the position, the speed, and the movement direction of the communication terminal 1-1a detected by the position detection means 15, the speed detection means 16, and the direction detection means 17 (step S81). Next, the data provision unit 11a creates the list notification message as illustrated in FIG. 7 (step S82). A node vector of the list notification message includes the position, the speed, and the movement direction of the communication terminal 1-1a detected by the aforementioned detection means 15 to 17. Thereafter, the data provision unit 11a transmits the list notification message to the communication terminal 1-2a (step S83).

When the list notification message is received from the communication terminal 1-1a, a data acquisition unit and a request possibility determination unit (both of them are not illustrated) of the communication terminal 1-2a perform processes to be described later, which are similar to those of the data acquisition unit 12a and the request possibility determination unit 13a. Then, when there are differential contents and there is a possibility of acquiring the differential contents from the communication terminal 1-1a, the communication terminal 1-2a transmits a data request message for requesting the acquisition of the differential contents to the communication terminal 1-1a. The differential contents are contents not possessed in the communication terminal 1-2a, but are possessed in the communication terminal 1-1a.

After the data provision unit 11a of the other communication terminal 1-1a transmits the list notification message, when the data request message has been received from the communication terminal 1-2a in a predetermined time (Yes in step S84), the data provision unit 11a performs step S85. The data provision unit 11a reads contents requested by the aforementioned data request message from the data storage unit 14a, and transmits the contents to the communication terminal 1-2a by a data response message (step S85).

Next, the operations of the data acquisition unit 12a and the request possibility determination unit 13a will be described.

When the list notification message is received from the communication terminal 1-2a (Yes in step S91 of FIG. 9), the data acquisition unit 12a compares the list with a list of contents stored in the data storage unit 14a, thereby obtains differential contents (step S92). The list notification message includes a list of contents possessed in the communication terminal 1-2a. The differential contents are contents not possessed in the communication terminal 1-1a, but are possessed in the communication terminal 1-2a.

When there are no differential contents (No in step S93), the data acquisition unit 12a ends the procedure. On the other hand, when there are the differential contents (Yes in step S93), the data acquisition unit 12a outputs a decision request to the request possibility determination unit 13a (step S94).

If the decision request is received from the data acquisition unit 12a, the relative speed calculation means 131 of the request possibility determination unit 13a calculates the relative speed of the communication terminal 1-1a and the communication terminal 1-2a (step S101) as illustrated in the flowchart of FIG. 10. The relative speed calculation means 131 calculates the relative speed on the basis of the speed and the movement direction of the communication terminal 1-1a and the speed and the movement direction of the communication terminal 1-2a. The speed and the movement direction of the communication terminal 1-1a are the speed and the movement direction respectively detected by the speed detection means 16 and the direction detection means 17. The speed and the movement direction of the communication terminal 1-2a are the speed and the movement direction respectively included in the node vector of the list notification message received from the communication terminal 1-2a.

Next, the communicable time calculation means 132 calculates a communicable time T on the basis of the relative speed, the position of the communication terminal 1-1a, the position of the communication terminal 1-2a, and the information representing the communicable range (step S102). The relative speed is the speed calculated by the relative speed calculation means 131. The position of the communication terminal 1-1a is the position detected by the position detection means 15. The position of the communication terminal 1-2a is the position received from the communication terminal 1-2a.

Thereafter, the determination means 133 compares the communicable time T, which is an index value for determining whether to transmit the data request message, with a threshold value calculated in consideration of the size of contents (step S103). Herein, the threshold value indicates a reception time required for receiving N contents (N is an integer equal to or more than 1), and for example, is calculated as follows. Herein, for example, it is assumed that the number and size of contents (the differential contents) requested for the communication terminal 1-2a are as illustrated in FIG. 14. In addition, the differential contents have been obtained in step S92 of FIG. 9 and the size of each content is included in the list notification message received in step S91.

First, the determination means 133 obtains a sum value of the sizes of the contents requested for the communication terminal 1-2a. In this example, sizes ZA, ZB, ZC of contents A, B, C are added to one another, so that the size (ZA+ZB+ZC) of the three contents is obtained. Thereafter, the determination means 133 divides the aforementioned size (ZA+ZB+ZC) by a data transmission amount per a unit time between the communication terminals 1-1a, 1-2a, thereby calculating a reception time (a threshold value) required for receiving all the three contents. The above is a calculation method of the threshold value.

When the communicable time T is smaller than the threshold value (Yes in step S103), the determination means 133 determines that there is no possibility of acquiring contents even though the differential contents have been requested for the communication terminal 1-2a. Then, on the basis of the determination result, the determination means 133 decides not to transmit a data request message. Then, the determination means 133 hands over the decision contents to data acquisition unit 12a (steps S105, S106). On the other hand, when the communicable time T is equal to or more than the threshold value (No in step S103), the determination means 133 determines that there is a possibility of acquiring the contents if the differential contents are requested for the communication terminal 1-2a. Then, on the basis of the determination result, the determination means 133 decides to transmit the data request message. Then, the determination means 133 hands over the decision contents to data acquisition unit 12a (steps S104, S106). In this way, the determination means 133 decides whether to transmit the data request message in consideration of the actual number and size of contents, so that it is possible to prevent a communication band from being wastefully consumed.

When the decision contents notified from the request possibility determination unit 13a indicate "transmission of the data request message" (Yes in step S95), the data acquisition unit 12a transmits the data request message for requesting the differential contents to the communication terminal 1-2a. On the other hand, when the decision contents indicate "non-transmission of the data request message" (No in step S95), the data acquisition unit 12a ends the procedure.

According to the present exemplary embodiment, effects similar to those of the first exemplary embodiment are obtained and the following effects can be obtained.

The present exemplary embodiment has the following configuration. First, the data acquisition unit 12a receives the list notification message from another communication terminal. Secondly, the request possibility determination unit 13a calculates a communicable time on the basis of the speeds, positions, and movement directions of both communication terminals. Thirdly, on the basis of the calculated communicable time, the request possibility determination unit 13a decides whether to transmit the data request message, that is, decides the presence or absence of a possibility of acquiring data. Therefore, as compared with the first exemplary embodiment, it is possible to more accurately decide the presence or absence of a possibility of acquiring data. As described above, in the first exemplary embodiment, it is decided whether to transmit the data request message on the basis of at least one of a speed difference, a distance, and an angle between movement directions of both communication terminals. In this way, in the present exemplary embodiment, it is possible to more accurately determine the presence or absence of a possibility of acquiring data, so that it is possible to enhance a success rate of data acquisition to be performed after it is determined that there is a possibility of acquiring data, as compared with the first exemplary embodiment. Consequently, in the present exemplary embodiment, it is possible to further reduce a possibility that a band is consumed due to wasteful communication.

Furthermore, in the present exemplary embodiment, the determination means 133 compares the calculated communicable time with the data reception required time calculated on the basis of the sizes of the total data to be acquired, thereby determining the presence or absence of a possibility of acquiring data. Consequently, in the present exemplary embodiment, it is possible to further enhance the accuracy of the determination.

[Third Exemplary Embodiment of Present Invention]

Next, a third exemplary embodiment of the present invention will be described. The present exemplary embodiment is characterized in that, when list notification messages have been received from a plurality of communication terminals and differential contents for these communication terminals are equal to one another, a data request message is transmitted to a communication terminal with the highest possibility of receiving the differential contents. In addition, in the following description, differences with the second exemplary embodiment will be mainly described.

Figure 11:
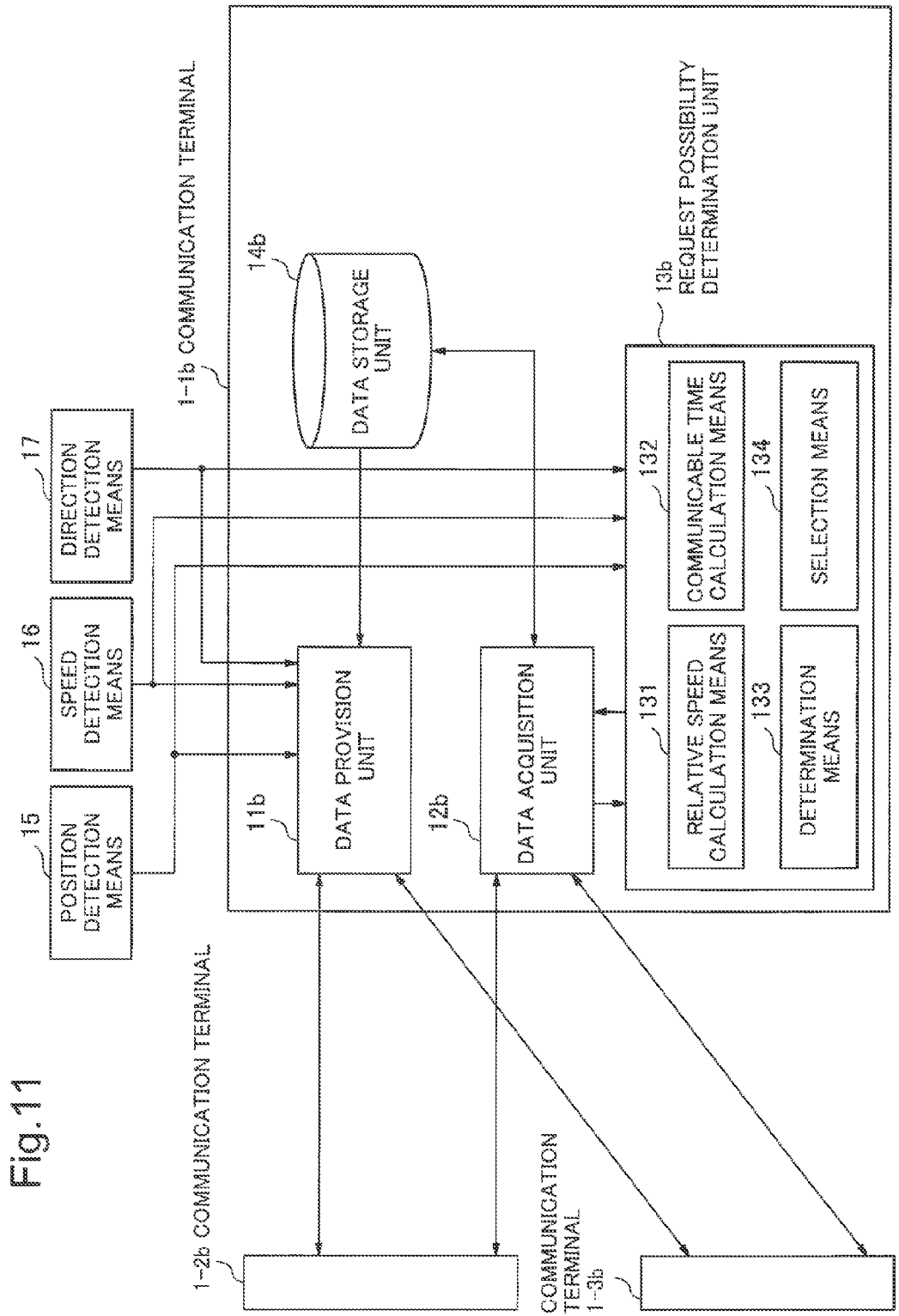
FIG. 11 is a block diagram of a communication terminal according to a third exemplary embodiment of the present invention.

Referring to FIG. 11, a data sharing system according to the present exemplary embodiment includes communication terminals 1-1b, 1-2b, 1-3b configured to be able to communicate with one another in a wireless manner. The communication terminal 1-1b includes a data provision unit 11b, a data acquisition unit 12b, a request possibility determination unit 13b, a data storage unit 14b, a position detection means 15, a speed detection means 16, and a direction detection means 17.

The data storage unit 14b stores one or more contents, similarly to the data storage unit 14a.

The data provision unit 11b includes functions similar to those of the data provision unit 11a of the second exemplary embodiment.

The data acquisition unit 12b includes the following functions in addition to the functions provided to the data acquisition unit 12a of the second exemplary embodiment. First, when list notification messages have been successively received from a plurality of terminals and there are a plurality of communication terminals with the same differential contents, the data acquisition unit 12b outputs a selection request to the request possibility determination unit 13b. Secondly, the data acquisition unit 12b transmits a data request message to a communication terminal selected by the request possibility determination unit 13b in response to the selection request. Herein, the selection request means a request for deciding one communication terminal with a higher possibility of acquiring data when the same data has been requested for a plurality of communication terminals.

The request possibility determination unit 13b is different from the request possibility determination unit 13a of the second exemplary embodiment in that a selection means 134 is added.

The selection means 134 includes a function of selecting a communication terminal with the highest possibility of acquiring differential contents from communication terminals with the same differential contents when the selection request is received from the data acquisition unit 12b.

In addition, the data provision unit 11b, the data acquisition unit 12b, and the request possibility determination unit 13b can be realized by CPU, similarly to the second exemplary embodiment.

Figure 12:
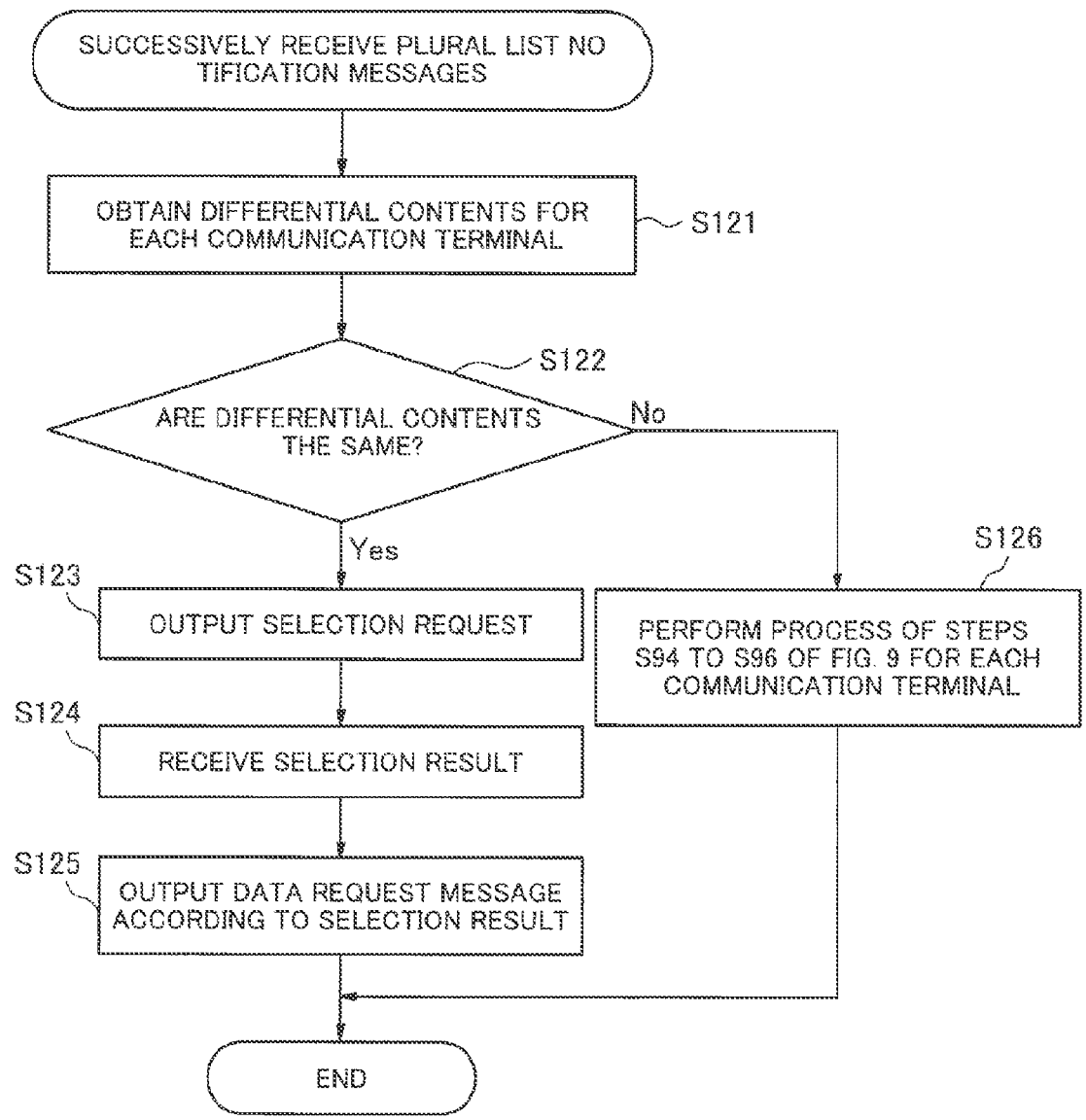
FIG. 12 is a flowchart illustrating a processing example when a data acquisition unit has successively received a plurality of list notification messages in a third exemplary embodiment of the present invention.
Figure 13:
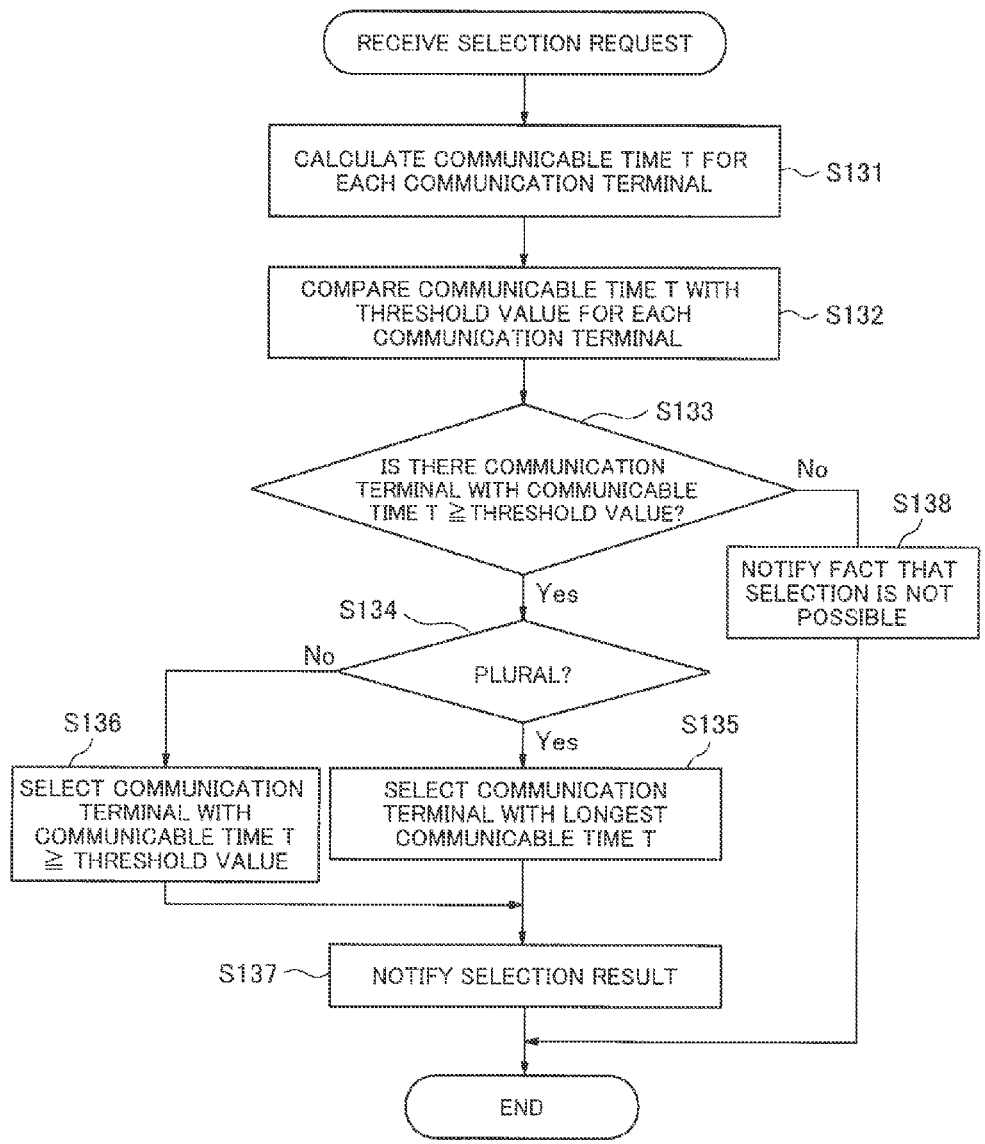
FIG. 13 is a flowchart illustrating a processing example when a request possibility determination unit has received a selection request in a third exemplary embodiment of the present invention.

Next, with reference to FIG. 12 and FIG. 13, an operation of the present exemplary embodiment will be described. In addition, FIG. 12 is a flowchart illustrating a processing example of the data acquisition unit 12b, and FIG. 13 is a flowchart illustrating a processing example of the request possibility determination unit 13b. Furthermore, since operations, other than the case in which list notification messages have been successively received from a plurality of communication terminals, are similar to those of the second exemplary embodiment, only the operations of the case in which the list notification messages have been successively received from the plurality of communication terminals will be described below. Herein, the case, in which a communication terminal successively receives the list notification messages from a plurality of communication terminals, for example, means the following situation. In general, a communication terminal has a memory for temporarily storing a message received from another communication terminal. The data acquisition unit 12b performs a process of reading unprocessed list notification messages from the aforementioned memory regularly or at the time of end of previous message processing. A situation, in which at the time of reading from this memory, a plurality of unprocessed list notification messages have been stored in the memory, is one example of the situation in which the list notification messages have been successively received from the plurality of communication terminals.

When the list notification messages are successively received from a plurality of communication terminals, the data acquisition unit 12b obtains differential contents for the communication terminal 1-2b and differential contents for the communication terminal 1-3b (step S121) as illustrated in the flowchart of FIG. 12. Herein, the plurality of communication terminals are the communication terminal 1-2b, the communication terminal 1-3b. Next, the data acquisition unit 12b determines whether both contents are the same (step S122).

When both contents are not the same (No in step S122), the data acquisition unit 12b performs processes similar to those illustrated in steps S94 to S96 of FIG. 9 with respect to each of the communication terminals 1-2b, 1-3b (step S126).

On the other hand, when both contents are the same (Yes in step S122), the data acquisition unit 12b outputs a selection request to the request possibility determination unit 13b (step S123). The selection request includes transmission source information of list notification messages received from the communication terminals 1-2b, 1-3b.

In this way, the selection means 134 of the request possibility determination unit 13b calculates a communicable time for each of the communication terminals 1-2b, 1-3b (step S131) as illustrated in the flowchart of FIG. 13. Thereafter, the selection means 134 compares the calculated communicable times with a threshold value for each of the communication terminals 1-2b, 1-3b (step S132). Next, the selection means 134 determines whether there is a communication terminal with a communicable time equal to or more than the threshold value (step S133).

When there is no communication terminal with the communicable time equal to or more than the threshold value (No in step S133), the selection means 134 notifies the data acquisition unit 12b of the absence of a corresponding communication terminal as the selection result (step S138). On the other hand, when there is the communication terminal with the communicable time equal to or more than the threshold value (Yes in step S133), the selection means 134 determines whether there are a plurality of such communication terminals (step S134).

When there is only one communication terminal with the communicable time equal to or more than the threshold value (No in step S134), the selection means 134 selects the communication terminal and notifies the data acquisition unit 12b of identification information of the selected communication terminal (steps S136, S137). On the other hand, when there are a plurality of communication terminals with the communicable time equal to or more than the threshold value (Yes in step S134), the selection means 134 selects one with the longest communicable time from them (step S135). Next, the selection means 134 notifies the data acquisition unit 12b of identification information of the selected communication terminal (step S137).

When the selection results are received, the data acquisition unit 12b transmits a data request message according to the selection results (step S125). In detail, when the absence of the corresponding communication terminal has been notified as the selection results, the data acquisition unit 12b ends the procedure without transmitting the data request message. Furthermore, when identification information of a communication terminal has been notified as the selection results, the data acquisition unit 12b transmits the data request message to the communication terminal.

In addition, in the aforementioned description, as an index value for selecting a communication terminal, the communicable time has been used; however, the index value is not limited thereto, and electric field intensity and the like can be used. Furthermore, in the aforementioned description, when there are communication terminals with the same differential contents, the data acquisition unit 12b outputs a selection request to the request possibility determination unit 13b. However, when there are communication terminals with differential contents partially overlapping each other, the data acquisition unit 12b may also output the selection request.

According to the present exemplary embodiment, when a communication terminal has encountered with another single communication terminal, effects similar to those of the second exemplary embodiment are obtained. Moreover, according to the present exemplary embodiment, when a communication terminal has encountered with a plurality of other communication terminals simultaneously or successively, it is possible to further reduce wasteful communication as compared with the second exemplary embodiment. The reason for this is as follows. In the present exemplary embodiment, when there are a plurality of other communication terminals with the same achievable differential contents, another communication terminal with a higher possibility of acquiring the contents is selected from them. Furthermore, in the present exemplary embodiment, a data request message is transmitted to the selected other communication terminal. In this way, in the present exemplary embodiment, another communication terminal with a higher possibility of acquiring data is selected, so that it is possible to enhance a probability of succeeding in data acquisition, as compared with the second exemplary embodiment. Consequently, in the present exemplary embodiment, it is possible to further prevent a band from being consumed due to wasteful communication.

Furthermore, according to the present exemplary embodiment, as compared with the second exemplary embodiment, it is possible to enhance a success rate of data sharing when a communication terminal has encountered with a plurality of other communication terminals simultaneously or successively. In relation to the reason, in the second exemplary embodiment, when there are a plurality of other communication terminals with the same achievable differential contents, there is a case in which the communication terminal attempts to acquire differential contents from another communication terminal with a lower possibility of acquiring the contents. When failed in the acquisition, there is a case in which the existing remaining other communication terminals are far apart from the communication terminal, and the communication terminal is not able to acquire data from any other communication terminals. On the other hand, in the present exemplary embodiment, another communication terminal with a higher possibility of acquiring contents is selected and the communication terminal attempts the acquisition of the contents.

So far, the present invention has been described with reference to the aforementioned each exemplary embodiment; however, the present invention is not limited to the aforementioned exemplary embodiments and the following various modifications can be made.

For example, in the second exemplary embodiment, in step S103 of FIG. 10, the communicable time T is compared with the threshold value calculated in consideration of the actual number and the size of contents. In this way, it is determined whether there is a possibility of acquiring contents from the communication terminal 1-2a. However, the communicable time T may be compared with a threshold value calculated in consideration of the actual number of contents and it may be determined whether there is a possibility of acquiring contents. Herein, as the threshold value calculated in consideration of the actual number of contents, for example, when the number of differential contents is set to N (N is an integer equal to or more than 1), an average reception time required for receiving the N contents can be used. When such a threshold value is used, even though the size of contents is obscure, it is possible to determine whether it is possible to acquire contents with a certain degree of accuracy. Furthermore, even though determination accuracy is lower, the communicable time T may also be compared with a predetermined fixed threshold value.

Furthermore, for example, in the second exemplary embodiment, in step S103 of FIG. 10, the communicable time is compared with the threshold value, so that it is determined whether there is a possibility of acquiring contents. However, the relative speed of the communication terminals 1-1a, 1-2a detected by the relative speed calculation means 131 may also be compared with the threshold value. When the relative speed is smaller than the threshold value, it may be determined that there is a possibility of acquiring contents, and when the relative speed is equal to or more than the threshold value, it may be determined that there is no possibility of acquiring contents. That is, when the relative speed is large, since the communicable time is short, it is determined that there is no possibility of acquiring contents. The communicable time is a time from when the communication terminal 1-1a receives the list notification message from the communication terminal 1-2a until the communication terminal 1-1a then goes out of a communicable range in which communication with the communication terminal 1-2a is possible.

Furthermore, for example, in the second exemplary embodiment, in step S103 of FIG. 10, the communicable time T is compared with the threshold value, so that it is decided whether to transmit the data request message. However, the following can also be performed. On the basis of the communicable time T and a wireless condition (a frequency, a band, an SN ratio) or a communication protocol, a data amount receivable in the aforementioned communicable time T is calculated. The receivable data amount is compared with a data amount of contents to be received, so that it can be decided whether to transmit the data request message. That is, when the receivable data amount is equal to or more than the data amount of contents to be received, it is decided to transmit the data request message, and when the receivable data amount is smaller than the data amount of contents to be received, it is decided not to transmit the data request message.

Furthermore, for example, in the second exemplary embodiment, in step S103 of FIG. 10, on the basis of whether it is possible to acquire N contents (all differential contents), it is decided whether to transmit the data request message. However, on the basis of whether it is possible to acquire M (M is a predetermined integer equal to or more than 1) or more transmission units of contents, it can also be decided whether to transmit the data request message. For example, in the case of DTN (Delay/DisruptionTolerant Network), a bundle is a transmission unit of contents. In this way, even though it is not possible to receive all the differential contents, it is possible to receive at least one bundle constituting the aforementioned differential contents.

Furthermore, for example, as illustrated in FIG. 15, in a list of a list notification message, a flag ("1" denotes importance, "0" denotes non-importance) indicating whether contents are important may also be provided. When differential contents include contents with a flag of "1", a data request message may be allowed to be transmitted without any conditions. In more detail, when it has been determined that there are differential contents (Yes in step S93) in step S93 of FIG. 9, the data acquisition unit 12b determines whether there are important contents with the flag of "1" in the differential contents. When there are the contents with the flag of "1", it is sufficient if the data acquisition unit 12b immediately transmits the data request message, and when there are no contents with the flag of "1", it is sufficient if the data acquisition unit 12b performs the process of step S94.

FIG. 16 illustrates one example of a hardware configuration when the communication terminal 1-1 has been configured by an electronic information processing apparatus such as a computer. The communication terminal 1-1 includes a CPU (Central Processing Unit) peripheral unit, an input/output unit, and a legacy input/output unit. The CPU peripheral unit includes a CPU 902, a RAM (Random Access Memory) 903, a graphic controller 904, and a display device 905 connected to one another by a host controller 901. The input/output unit includes a communication interface 907, a hard disk drive 908, and a CD-ROM (Compact Disk Read Only Memory) drive 909 connected to the host controller 901 by an input/output controller 906. The legacy input/output unit includes a ROM (Read Only Memory) 910, a flexible disk drive 911, and an input/output chip 912 connected to the input/output controller 906.

The host controller 901 connects the RAM 903, the CPU 902 accessing the RAM 903 at a high transmission rate, and the graphic controller 904 to one another. The CPU 902 operates on the basis of programs stored in the ROM 910 and the RAM 903, and controls each unit. The graphic controller 904 acquires image data which is generated on a frame buffer provided in the RAM 903 by the CPU 902 and the like, and allows the acquired image data to be displayed on the display device 905. Instead, the graphic controller 904 may also include the frame buffer for storing the image data generated by the CPU 902 and the like therein.

The input/output controller 906 connects the host controller 901 to the hard disk drive 908, the communication interface 907, and the CD-ROM drive 909, which are relative high speed input/output devices, to one another. The hard disk drive 908 stores programs and data used in the CPU 902. The communication interface 907 connects to the other communication terminal 1-2 and transmits/receives programs or data to/from the other communication terminal 1-2. A communication scheme is arbitrary. For example, a Wi-Fi direct may be used. The CD-ROM drive 909 reads programs or data from a CD-ROM 992, and provides the programs or data to the hard disk drive 908 and the communication interface 907 via the RAM 903.

The ROM 910, the flexible disk drive 911, and an input/output chip 912, which are relative low speed input/output devices, are connected to the input/output controller 906. The ROM 910 stores a booting program which is executed when the communication terminal 1-1 starts to operate, a program depending on the hardware of the communication terminal 1-1, and the like. The flexible disk drive 911 reads programs or data from a flexible disk 993 and provides the programs or data to the hard disk drive 908 and the communication interface 907 via the RAM 903. The input/output chip 912 connects various input/output devices via the flexible disk drive 911, or a parallel port, a serial port, a keyboard port, a mouse port and the like.

A program to be executed by the CPU 902 is stored in a recording medium such as the flexible disk 993, the CD-ROM 992, and an IC (Integrated Circuit) card and is provided by a user. The program stored in the recording medium may be compressed or not. The program is installed in the hard disk drive 908 from the recording medium, is read by the RAM 903, and is executed by the CPU 902. The program executed by the CPU 902 causes the communication terminal 1-1 to serve as the data provision unit 11, the data acquisition unit 12, the request possibility determination unit 13 described in association with FIG. 2. Furthermore, the program causes the communication terminal 1-1 to serve as the data provision unit 11a, the data acquisition unit 12a, the request possibility determination unit 13a described in association with FIG. 6. Furthermore, the program causes the communication terminal 1-1 to serve as the data provision unit 11b, the data acquisition unit 12b, the request possibility determination unit 13b described in association with FIG. 11.

The aforementioned program may also be stored in an external recording medium. As the recording medium, an optical recording medium such as DVD (Digital Versatile Disk) and PD (Phase Disk) can be used in addition to the flexible disk 993, the CD-ROM 992. Moreover, as the recording medium, a magneto-optical recording medium such as MD (MiniDisk), a tape medium, a semiconductor memory such as an IC card, and the like can be used. Furthermore, a recording medium such as a hard disk and a RAM provided in a server system connected to a dedicated communication network or the Internet may also be used as the recording medium, and an information sharing system as a program via a network may also be provided.

While the present invention has been described with reference to the aforementioned each exemplary embodiment, the present invention is not limited to the aforementioned exemplary embodiments. It will be understood by those of ordinary skill in the art that various changes in form and details of the present invention can be made therein without departing from the spirit and scope of the present invention.

This application is based upon and claims the benefit of priority from Japanese Patent Application No. 2012-253105 filed on Nov. 19, 2012, the entire contents of which are incorporated herein by reference.

INDUSTRIAL APPLICABILITY

The present invention can be applied to a data sharing system that performs sharing of data such as various contents in an ad-hoc network or a network other than the ad-hoc network between communication terminals mounted in a vehicle such as a car or between portable communication terminals.

REFERENCE SIGNS LIST

1-1, 1-2, 1-1a, 1-2a, 1-1b, 1-2b, 1-3b Communication terminal
11, 11a, 11b Data provision unit
12, 12a, 12b Data acquisition unit
13, 13a, 13b Request possibility determination unit
131 Relative speed calculation means
132 Communicable time calculation means
133 Determination means
134 Selection means
14, 14a, 14b Data storage unit
15 Position detection means
16 Speed detection means
17 Direction detection means

The invention claimed is:

1. A data sharing system that shares data between a plurality of communication terminals capable of exchanging communication messages in a wireless manner,
wherein each of said communication terminals comprises:
a memory storing program instructions; and
a processor configured to execute the program instructions in order to:
store one or more pieces of data in the memory;
transmit a list of information regarding data stored in the memory to another communication terminal, read data requested by said other communication terminal from the memory, and transmit the requested data to said other communication terminal;
receive a list of data transmitted from said other communication terminal;
determine a data item on the received list that is not stored in the memory;
determine whether a communication time between the other communication terminal that transmitted said list and said communication terminal is sufficient for said communication terminal to acquire data from the other communication terminal based on at least one of a speed difference between said communication terminal and said other communication terminal, a distance between said communication terminal and said other communication terminal, and an angle between a movement direction of said communication terminal and a movement direction of said other communication terminal; and
if the communication time is determined to be sufficient, request data associated with said data item from said other communication terminal,
wherein, when said communication terminal receives a list of data from each of a plurality of other communication terminals, and when communication times for each of said plurality of other communication terminals with said communication terminal are sufficient for said communication terminal to acquire data from each of said plurality of other communication terminals, the processor is further configured to execute the program instructions in order to:
select one of said plurality of other communications terminals with a higher possibility of acquiring data than other communication terminals among said plurality of other communication terminals; and
request data from the selected other communication terminal.

2. The data sharing system according to claim 1, wherein the processor is configured to determine whether the communication time is sufficient for said communication terminal to acquire data based on a relative speed of said communication terminal and said other communication terminal.

3. The data sharing system according to claim 1, wherein the processor is configured to calculate the communication time between said communication terminal and said other communication terminal based on a relative speed between said communication terminal and said other communication terminal, positions of said communication terminal and said other communication terminal, and movement directions of said communication terminal and said other communication terminal.

4. The data sharing system according to claim 3, wherein the processor is configured to compare said calculated communication time with a fixed threshold value and determine whether said communication time is sufficient for said communication terminal to acquire data based on said comparison.

5. The data sharing system according to claim 3, wherein the processor is further configured to determine whether the calculated communication time is sufficient based on a size of said data item on the received list that is not stored in the memory.

6. A communication terminal comprising:
a memory storing program instructions and one or more pieces of data;

a processor configured to execute the program instructions in order to:
transmit a list of information regarding data stored in the memory to another communication terminal, read data requested by said other communication terminal from the memory, and transmit the requested data to said other communication terminal;
receive a list of data transmitted from said other communication terminal;
determine a data item on the received list that is not stored in the memory;
determine whether a communication time between the other communication terminal that transmitted said list and said communication terminal is sufficient for said communication terminal to acquire data from the other communication terminal based on at least one of a speed difference between said communication terminal and said other communication terminal, a distance between said communication terminal and said other communication terminal, and an angle between a movement direction of said communication terminal and a movement direction of said other communication terminal; and
if the communication time is determined to be sufficient, request said data item from said other communication terminal wherein, when said communication terminal receives a list of data from each of a plurality of other communication terminals, and when communication times for each of said plurality of other communication terminals with said communication terminal is sufficient for said communication terminal to acquire data from each of said plurality of other communication terminals, the processor is further configured to execute the program instructions in order to:
select one of said plurality of other communication terminals with a higher possibility of acquiring data than other communication terminals among said plurality of other communication terminals; and
request data from the selected other communication terminal.

7. The data sharing system according to claim 6, wherein the processor is configured to determine whether communication time is sufficient for said communication terminal to acquire data based on a relative speed of said communication terminal and said other communication terminal.

8. The data sharing system according to claim 6, wherein the processor is configured to calculate the communication time between said communication terminal and said other communication terminal based on a relative speed between said communication terminal and said other communication terminal, positions of said communication terminal and said other communication terminal, and movement directions said communication terminal and said other communication terminal.

9. The data sharing system according to claim 8, wherein the processor is configured to compare said calculated communication time with a fixed threshold value and determine whether said communication time is sufficient for said communication terminal to acquire data based on said comparison.

10. The data sharing system according to claim 8, wherein the processor is further configured to determine whether the calculated communication time is sufficient based on a size of said data item on the received list that is not stored in the memory.

11. A data sharing method that shares data between a first communication terminal and a plurality of other communication terminals capable of exchanging communication messages in a wireless manner, comprising:
a first step in which a plurality of said other communication terminals each transmit a list of information regarding data possessed by each of said plurality of other communication terminals to said first communication terminal;
a second step in which said first communication terminal determines a data item on each of the transmitted lists is not stored in a memory of the first communication terminal;
a third step in which said first communication terminal determines, for each communication terminal in said plurality of other communication terminals, whether a communication time between said other communication terminal and said first communication terminal is sufficient for said first communication terminal to acquire data from the other communication terminal based on at least one of a speed difference between said first communication terminal and said other communication terminal, a distance between said first communication terminal and said other communication terminal, and an angle between a movement direction of said first communication terminal and a movement direction of said other communication terminal;
a fourth step in which, when communication times for each of said plurality of other communication terminals with said first communication terminal are sufficient for said first communication terminal to acquire data from each of said plurality of other communication terminals, said first communication terminal selects one of said plurality of other communication terminals with a higher possibility of acquiring data than other communication terminals among said plurality of other communication terminals, and requests data associated with said determined data item from said selected communication terminal; and
a fifth step in which said selected communication terminal transmits the data requested by said first communication terminal to said first communication terminal.

12. A data sharing method in which a communication terminal including a memory for storing one or more pieces of data and capable of exchanging communication messages with a plurality of other communication terminals in a wireless manner shares data with said plurality of other communication terminals, comprising:
a first step of receiving a plurality of lists, wherein each list includes information regarding data possessed by each of said plurality of other communication terminals;
a second step of determining a data item on each received list is not stored in the memory of said communication terminal;
a third step of determining, for each communication terminal in said plurality of other communication terminals, whether a communication time between said other communication terminal and said communication terminal is sufficient for said communication terminal to acquire data from the other communication terminal based on at least one of a speed difference between said communication terminal and said other communication terminal, a distance between said communication terminal and said other communication terminal, and an angle between a movement direction of said communication terminal and a movement direction of said other communication terminal; and a fourth step of, when communication times for each of said plurality of other communication terminals with said communication terminal are sufficient for said communication terminal to acquire data from each of said plurality of other communication terminals, selecting one of said plurality of other communication terminals with a higher possibility of acquiring data than other communication terminals among said plurality of other communication terminals, and requesting data associated with said determined data item from said selected communication terminal.

13. A non-transitory computer-readable recording medium having embodied thereon a program that causes a computer to implement a communication terminal including a memory for storing one or more pieces of data to:

transmit a list of information regarding data stored in the memory to another communication terminal, read data requested by said other communication terminal from the memory, and transmit the requested data to said other communication terminal;

receive a list of data transmitted from said other communication terminal;

determine a data item on the received list that is not stored in the memory;

determine whether a communication time between the other communication terminal that transmitted said list and said communication terminal is sufficient for said communication terminal to acquire data from the other communication terminal based on at least one of a speed difference between said communication terminal and said other communication terminal, a distance between said communication terminal and said other communication terminal, and an angle between a movement direction of said communication terminal and a movement direction of said other communication terminal; and if the communication time is determined to be sufficient, request data associated with said data item from said other communication terminal, wherein, when said communication terminal receives a list of data from each of a plurality of other communication terminals, and when communication times for each of said plurality of other communication terminals with said communication terminal are sufficient for said communication terminal to acquire data from each of said plurality of other communication terminals:

select one of said plurality of other communication terminals with a higher possibility of acquiring data than other communication terminals among said plurality of other communication terminals; and request data from the selected other communication terminal.

* * * * *